United States Patent
Tran et al.

(10) Patent No.: US 10,534,554 B2
(45) Date of Patent: Jan. 14, 2020

(54) ANTI-HACKING MECHANISMS FOR FLASH MEMORY DEVICE

(71) Applicant: Silicon Storage Technology, Inc., San Jose, CA (US)

(72) Inventors: Hieu Van Tran, San Jose, CA (US); Vipin Tiwari, Dublin, CA (US); Nhan Do, Saratoga, CA (US)

(73) Assignee: SILICON STORAGE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/784,025

(22) Filed: Oct. 13, 2017

(65) Prior Publication Data
US 2019/0114097 A1    Apr. 18, 2019

(51) Int. Cl.
| | | |
|---|---|---|
| *G06F 3/06* | (2006.01) | |
| *G06F 11/07* | (2006.01) | |
| *G11C 16/04* | (2006.01) | |
| *G11C 16/08* | (2006.01) | |
| *G11C 16/10* | (2006.01) | |
| *G11C 16/26* | (2006.01) | |
| *G11C 16/34* | (2006.01) | |
| *H01L 21/78* | (2006.01) | |
| *H01L 27/11521* | (2017.01) | |
| *H01L 29/423* | (2006.01) | |
| *H01L 23/00* | (2006.01) | |

(52) U.S. Cl.
CPC .......... *G06F 3/0622* (2013.01); *G06F 3/0637* (2013.01); *G06F 3/0679* (2013.01); *G06F 11/073* (2013.01); *G06F 11/0754* (2013.01); *G06F 11/0793* (2013.01); *G11C 16/0408* (2013.01); *G11C 16/08* (2013.01); *G11C 16/10* (2013.01); *G11C 16/26* (2013.01); *G11C 16/3422* (2013.01); *H01L 21/78* (2013.01); *H01L 27/11521* (2013.01); *H01L 29/42328* (2013.01); *H01L 23/576* (2013.01)

(58) Field of Classification Search
CPC ............... G06F 3/0622; G06F 11/0793; G06F 11/0754; G06F 11/073; G06F 3/0679; G06F 3/0637; H01L 21/78; H01L 27/11521; H01L 29/42328; H01L 23/576; G11C 16/3422; G11C 16/26; G11C 16/10; G11C 16/08; G11C 16/0408; G11C 29/025; G11C 29/18; G11C 29/48; G11C 7/065; G11C 16/28; G11C 16/0425
USPC .......................................................... 711/103
See application file for complete search history.

(56) References Cited

U.S. PATENT DOCUMENTS

| | | | | |
|---|---|---|---|---|
| 5,943,283 A | * | 8/1999 | Wong .................. | G06F 12/1408 365/221 |
| 7,038,947 B2 | * | 5/2006 | Chih .................. | G11C 16/0425 257/E21.209 |

(Continued)

*Primary Examiner* — Pierre Miche Bataille
(74) *Attorney, Agent, or Firm* — DLA Piper LLP US

(57) ABSTRACT

Apparatus, and an associated method, for enhancing security and preventing hacking of a flash memory device. The apparatus and method use a random number to offset the read or write address in a memory cell. The random number is generated by determining the leakage current of memory cells. In another embodiment, random data can be written or read in parallel to thwart hackers from determining contents of data being written or read by monitoring sense amplifiers.

12 Claims, 23 Drawing Sheets

(56) References Cited

U.S. PATENT DOCUMENTS

| | | | |
|---|---|---|---|
| 8,402,349 B2* | 3/2013 | Lee | G06F 11/1004 714/773 |
| 8,524,577 B2* | 9/2013 | Phua | H01L 24/96 438/464 |
| 9,659,659 B2* | 5/2017 | Sudo | G11C 16/10 |
| 2006/0101284 A1 | 5/2006 | Feuser et al. | |
| 2008/0128690 A1* | 6/2008 | Burnside | H01L 21/78 257/48 |
| 2008/0168214 A1 | 7/2008 | Kwon et al. | |
| 2008/0195875 A1* | 8/2008 | Hobson | G06F 1/3203 713/320 |
| 2009/0109766 A1* | 4/2009 | Terzioglu | G11C 7/18 365/189.15 |
| 2009/0113155 A1* | 4/2009 | Beals | G06F 12/1466 711/164 |
| 2010/0054043 A1 | 3/2010 | Liu et al. | |
| 2010/0070682 A1* | 3/2010 | Wan | G06F 12/0246 711/103 |
| 2011/0096612 A1 | 4/2011 | Steiner | |
| 2011/0273948 A1 | 11/2011 | Okahiro et al. | |
| 2012/0127805 A1* | 5/2012 | Dreesen | G11C 7/1069 365/189.04 |
| 2012/0307583 A1* | 12/2012 | Okahiro | G11C 11/406 365/222 |
| 2014/0146607 A1 | 5/2014 | Nagai et al. | |
| 2014/0241099 A1 | 8/2014 | Seo et al. | |
| 2014/0250341 A1* | 9/2014 | Mullarkey | G06F 11/10 714/724 |
| 2015/0261615 A1 | 9/2015 | Peterson et al. | |
| 2015/0310933 A1 | 10/2015 | Purushotham et al. | |
| 2016/0163377 A1* | 6/2016 | Oh | G11C 11/40615 365/222 |
| 2016/0351267 A1 | 12/2016 | Tran et al. | |
| 2017/0263303 A1 | 9/2017 | Fackenthal et al. | |
| 2018/0277174 A1* | 9/2018 | Tran | G11C 8/12 |

* cited by examiner

FIGURE 17C

| V<7:0> | | AY[2] | AY[1] | AY[0] | | AYA[2] | AYB[2] | AYA[1] | AYB[1] | AYA[0] | AYB[0] |
|---|---|---|---|---|---|---|---|---|---|---|---|
| WLY[0]= | V[0] | 0 | 0 | 0 | | 0 | 1 | 0 | 1 | 0 | 1 |
| WLY[1]= | V[1] | 0 | 0 | 1 | | 0 | 1 | 0 | 1 | 1 | 0 |
| WLY[2]= | V[2] | 0 | 1 | 0 | | 0 | 1 | 1 | 0 | 0 | 1 |
| WLY[3]= | V[3] | 0 | 1 | 1 | | 1 | 1 | 1 | 0 | 1 | 0 |
| WLY[4]= | V[4] | 1 | 0 | 0 | | 1 | 0 | 0 | 1 | 0 | 1 |
| WLY[5]= | V[5] | 1 | 0 | 1 | | 1 | 0 | 0 | 1 | 1 | 0 |
| WLY[6]= | V[6] | 1 | 1 | 0 | | 1 | 0 | 1 | 0 | 0 | 1 |
| WLY[7]= | V[7] | 1 | 1 | 1 | | 1 | 0 | 1 | 0 | 1 | 0 |

| T<3:0> | | AY[4] | AY[0] | | AYA[4] | AYB[4] | AYA[3] | AYB[3] |
|---|---|---|---|---|---|---|---|---|
| WLY[8]= | T[0] | 0 | 0 | | 0 | 1 | 0 | 1 |
| WLY[9]= | T[1] | 0 | 1 | | 0 | 1 | 1 | 0 |
| WLY[10]= | T[2] | 1 | 0 | | 1 | 0 | 0 | 1 |
| WLY[11]= | T[3] | 1 | 1 | | 1 | 0 | 1 | 0 |

ANTI-HACKING MECHANISMS FOR FLASH MEMORY DEVICE

TECHNICAL FIELD

A multitude of mechanisms are disclosed for enhancing security and preventing hacking of a flash memory device.

BACKGROUND OF THE INVENTION

Non-volatile memory cells are well known in the art. One prior art non-volatile split gate memory cell 10, which contains five terminals, is shown in FIG. 1. Memory cell 10 comprises semiconductor substrate 12 of a first conductivity type, such as P type. Substrate 12 has a surface on which there is formed a first region 14 (also known as the source line SL) of a second conductivity type, such as N type. A second region 16 (also known as the drain line) also of N type is formed on the surface of substrate 12. Between the first region 14 and the second region 16 is channel region 18. Bit line BL 20 is connected to the second region 16. Word line WL 22 is positioned above a first portion of the channel region 18 and is insulated therefrom. Word line 22 has little or no overlap with the second region 16. Floating gate FG 24 is over another portion of channel region 18. Floating gate 24 is insulated therefrom, and is adjacent to word line 22. Floating gate 24 is also adjacent to the first region 14. Floating gate 24 may overlap the first region 14 to provide coupling from the first region 14 into floating gate 24. Coupling gate CG (also known as control gate) 26 is over floating gate 24 and is insulated therefrom. Erase gate EG 28 is over the first region 14 and is adjacent to floating gate 24 and coupling gate 26 and is insulated therefrom. The top corner of floating gate 24 may point toward the inside corner of the T-shaped erase gate 28 to enhance erase efficiency. Erase gate 28 is also insulated from the first region 14. Memory cell 10 is more particularly described in U.S. Pat. No. 7,868,375, whose disclosure is incorporated herein by reference in its entirety.

One exemplary operation for erase and program of prior art non-volatile memory cell 10 is as follows. Memory cell 10 is erased, through a Fowler-Nordheim tunneling mechanism, by applying a high voltage on erase gate 28 with other terminals equal to zero volts. Electrons tunnel from floating gate 24 into erase gate 28 causing floating gate 24 to be positively charged, turning on the cell 10 in a read condition. The resulting cell erased state is known as '1' state.

Memory cell 10 is programmed, through a source side hot electron programming mechanism, by applying a high voltage on coupling gate 26, a high voltage on source line 14, a medium voltage on erase gate 28, and a programming current on bit line 20. A portion of electrons flowing across the gap between word line 22 and floating gate 24 acquire enough energy to inject into floating gate 24 causing the floating gate 24 to be negatively charged, turning off the cell 10 in a read condition. The resulting cell programmed state is known as '0' state.

Memory cell 10 is read in a Current Sensing Mode as following: A bias voltage is applied on bit line 20, a bias voltage is applied on word line 22, a bias voltage is applied on coupling gate 26, a bias or zero voltage is applied on erase gate 28, and a ground is applied on source line 14. There exists a cell current flowing from bit line 20 to source line 14 for an erased state and there is insignificant or zero cell current flow from the bit line 20 to the source line 14 for a programmed state. Alternatively, memory cell 10 can be read in a Reverse Current Sensing Mode, in which bit line 20 is grounded and a bias voltage is applied on source line 24. In this mode the current reverses the direction from source line 14 to bitline 20.

Memory cell 10 alternatively can be read in a Voltage Sensing Mode as following: A bias current (to ground) is applied on bit line 20, a bias voltage is applied on word line 22, a bias voltage is applied on coupling gate 26, a bias voltage is applied on erase gate 28, and a bias voltage is applied on source line 14. There exists a cell output voltage (significantly >0V) on bit line 20 for an erased state and there is insignificant or close to zero output voltage on bit line 20 for a programmed state. Alternatively, memory cell 10 can be read in a Reverse Voltage Sensing Mode, in which bit line 20 is biased at a bias voltage and a bias current (to ground) is applied on source line 14. In this mode, memory cell 10 output voltage is on the source line 14 instead of on the bit line 20.

In the prior art, various combinations of positive or zero voltages were applied to word line 22, coupling gate 26, and floating gate 24 to perform read, program, and erase operations In response to the read, erase or program command, the logic circuit 451 (in FIG. 4) causes the various voltages to be supplied in a timely and least disturb manner to the various portions of both the selected memory cell 10 and the unselected memory cells 10.

For the selected and unselected memory cell 10, the voltage and current applied are as follows. As used hereinafter, the following abbreviations are used: source line or first region 14 (SL), bit line 20 (BL), word line 22 (WL), and coupling gate 26 (CG).

TABLE NO. 1

Operation of Flash Memory Cell 10 Using Positive Voltages for Read, Erase, and Program

|  | WL | WL-unsel | BL | BL-unsel | CG | CG -unsel same sector | CG -unsel | EG | EG-unsel |
|---|---|---|---|---|---|---|---|---|---|
| Read | 1.0-2 V | 0 V | 0.6-2 V | 0 V-FLT | 0-2.6 V | 0-2.6 V | 0-2.6 V | 0-2.6 V | 0-2.6 V |
| Erase | 0 V | 0 V | 0 V | 0 V | 0 V | 0-2.6 V | 0-2.6 V | 11.5-12 V | 0-2.6 V |
| Program | 1 V | 0 V | 1 uA | Vinh | 10-11 V | 0-2.6 V | 0-2.6 V | 4.5-5 V | 0-2.6 V |

|  | SL | SL-unsel |
|---|---|---|
| Read | 0 V | 0 V-FLT |
| Erase | 0 V V | 0 V |
| Program | 4.5-5 V V | 0-1 V/FLT |

In a recent application by the applicant—U.S. patent application Ser. No. 14/602,262, filed on Jan. 21, 2015, which is incorporated by reference—the applicant disclosed an invention whereby negative voltages could be applied to word line 22 and/or coupling gate 26 during read, program, and/or erase operations. In this embodiment, the voltage and current applied to the selected and unselected memory cell 10, are as follows._

TABLE NO. 2

| | WL | WL - unsel | BL | BL - unsel | CG | CG -unsel same sector | CG - unsel | EG | EG- unsel |
|---|---|---|---|---|---|---|---|---|---|
| Read | 1.0-2 V | −0.5 V/0 V | 0.6-2 V | 0 V-FLT | 0-2.6 V | 0-2.6 V | 0-2.6 V | 0-2.6 V | 0-2.6 V |
| Erase | 0 V | 0 V | 0 V | 0 V | 0 V | 0-2.6 V | 0-2.6 V | 11.5-12 V | 0-2.6 V |
| Program | 1 V | −0.5 V/0 V | 1 uA | Vinh | 10-11 V | 0-2.6 V | 0-2.6 V | 4.5-5 V | 0-2.6 V |

| | SL | SL-unsel |
|---|---|---|
| Read | 0 V | 0 V-FLT |
| Erase | 0 V | 0 V |
| Program | 4.5-5 V | 0-1 V/FLT |

Operation of Flash Memory Cell 10 Using Negative Voltages for Read and/or Program In another embodiment of U.S. patent application Ser. No. 14/602,262, negative voltages can be applied to word line 22 when memory cell 10 is unselected during read, erase, and program operations, and negative voltages can be applied to coupling gate 26 during an erase operation, such that the following voltages are applied:

TABLE NO. 3

Operation of Flash Memory Cell 10 Using Negative Voltages for Erase

| | WL | WL - unsel | BL | BL - unsel | CG | CG -unsel same sector | CG - unsel | EG | EG- unsel |
|---|---|---|---|---|---|---|---|---|---|
| Read | 1.0-2 V | −0.5 V/0 V | 0.6-2 V | 0-FLT | 0-2.6 V | 0-2.6 V | 0-2.6 V | 0-2.6 V | 0-2.6 V |
| Erase | 0 V | −0.5 V/0 V | 0 V | 0-FLT | −(5-9) V | 0-2.6 V | 0-2.6 V | 8-9 V | 0-2.6 V |
| Program | 1 V | −0.5 V/0 V | 1 uA | Vinh | 8-9 V | CGINH (4-6 V) | 0-2.6 V | 8-9 V | 0-2.6 V |

| | SL | SL-unsel |
|---|---|---|
| Read | 0 V | 0-FLT |
| Erase | 0 V | 0 V |
| Program | 4.5-5 V | 0-1 V/FLT |

The CGINH signal listed above is an inhibit signal that is applied to the coupling gate 26 of an unselected cell that shares an erase gate 28 with a selected cell.

FIG. 2 depicts an embodiment of another prior art flash memory cell 210. As with prior art flash memory cell 10, flash memory cell 210 comprises substrate 12, first region (source line) 14, second region 16, channel region 18, bit line 20, word line 22, floating gate 24, and erase gate 28. Unlike prior art flash memory cell 10, flash memory cell 210 does not contain a coupling gate or control gate and only contains four terminals—bit line 20, word line 22, erase gate 28, and source line 14. This significantly reduces the complexity of the circuitry, such as decoder circuitry, required to operate an array of flash memory cells.

The erase operation (erasing through erase gate) and read operation are similar to that of the FIG. 1 except there is no control gate bias. The programming operation also is done without the control gate bias, hence the program voltage on the source line is higher to compensate for lack of control gate bias.

Table No. 4 depicts typical voltage ranges that can be applied to the four terminals for performing read, erase, and program operations:

TABLE NO. 4

Operation of Flash Memory Cell 210

| | WL | WL-unsel | BL | BL-unsel | EG | EG-unsel | SL | SL-unsel |
|---|---|---|---|---|---|---|---|---|
| Read | 0.7-2.2 V | −0.5 V/0 V | 0.6-2 V | 0 V/FLT | 0-2.6 V | 0-2.6 V | 0 V | 0 V/FLT/VB |
| Erase | −0.5 V/0 V | −.5 V/0 V | 0 V | 0 V | 11.5 V | 0-2.6 V | 0 V | 0 V |
| Program | 1-1.5 V | −.5 V/0 V | 1-3 μA | Vinh (~1.8 V) | 4.5 V | 0-2.6 V | 7-9 V | 0-1 V/FLT |

FIG. 3 depicts an embodiment of another prior art flash memory cell 310. As with prior art flash memory cell 10, flash memory cell 310 comprises substrate 12, first region (source line) 14, second region 16, channel region 18, bit line 20, and floating gate 24. Unlike prior art flash memory cell 10, flash memory cell 310 does not contain a coupling gate or control gate or an erase gate. In addition, word line 322 replaces word line 22 and has a different physical shape than word line 22, as depicted.

One exemplary operation for erase and program of prior art non-volatile memory cell 310 is as follows. The cell 310 is erased, through a Fowler-Nordheim tunneling mechanism, by applying a high voltage on the word line 322 and zero volts to the bit line and source line. Electrons tunnel from the floating gate 24 into the word line 322 causing the floating gate 24 to be positively charged, turning on the cell 310 in a read condition. The resulting cell erased state is known as '1' state. The cell 310 is programmed, through a source side hot electron programming mechanism, by applying a high voltage on the source line 14, a small voltage on the word line 322, and a programming current on the bit line 320. A portion of electrons flowing across the gap between the word line 322 and the floating gate 24 acquire enough energy to inject into the floating gate 24 causing the floating gate 24 to be negatively charged, turning off the cell 310 in read condition. The resulting cell programmed state is known as '0' state.

Exemplary voltages that can be used for the read, program, erase, and standby operations in memory cell 310 are shown below in Table 5:

TABLE No. 5

Operation of Flash Memory Cell 310

| Operation | WL | BL | SL |
|---|---|---|---|
| Read | Vwlrd | Vblrd | 0 V |
| Program | Vwlp | Iprog/Vinh (unsel) | Vslp |
| Erase | Vwler | 0 V | 0 V |
| Standby | 0 V | 0 V | 0 V |

Vwlrd ~2-3 V
Vblrd ~0.8-2 V
Vwlp ~1-2 V
Vwler ~11-13 V
Vslp ~9-10 V
Iprog ~1-3 ua
Vinh ~2 V Security and anti-tampering measures are becoming increasingly important as cyber-attackers and hackers become more and more sophisticated. For example, when a mobile phone is stolen, it is common for the thief or someone to whom the phone is sold to attempt to retrieve data from the phone. This can be done by hacking the password to the phone, or by hacking underlying hardware within the phone.

The prior art includes dozens of software-based security measures that can be implemented on the system level (e.g., for the phone). These measures, however, do not prevent someone from disassembling the phone and retrieving data directly from non-volatile storage such as from a flash memory device. To date, the security measures available for flash memory devices have been extremely limited.

What is needed are improved security measures specifically for flash memory devices.

SUMMARY OF THE INVENTION

Multiple embodiments are disclosed for enhancing security and preventing hacking of a flash memory device. The embodiments prevent malicious actors from hacking a flash memory chip to obtain data that is stored within the chip. The embodiments include the use of fault detection circuits, address scrambling, dummy arrays, password protection, improved manufacturing techniques, and other mechanisms.

BRIEF DESCRIPTION OF THE DRAWINGS

FIGS. 17A, 17B, and 17C depict an address fault detection system for a flash memory system.

DETAILED DESCRIPTION OF THE PREFERRED EMBODIMENT

Figure 1:
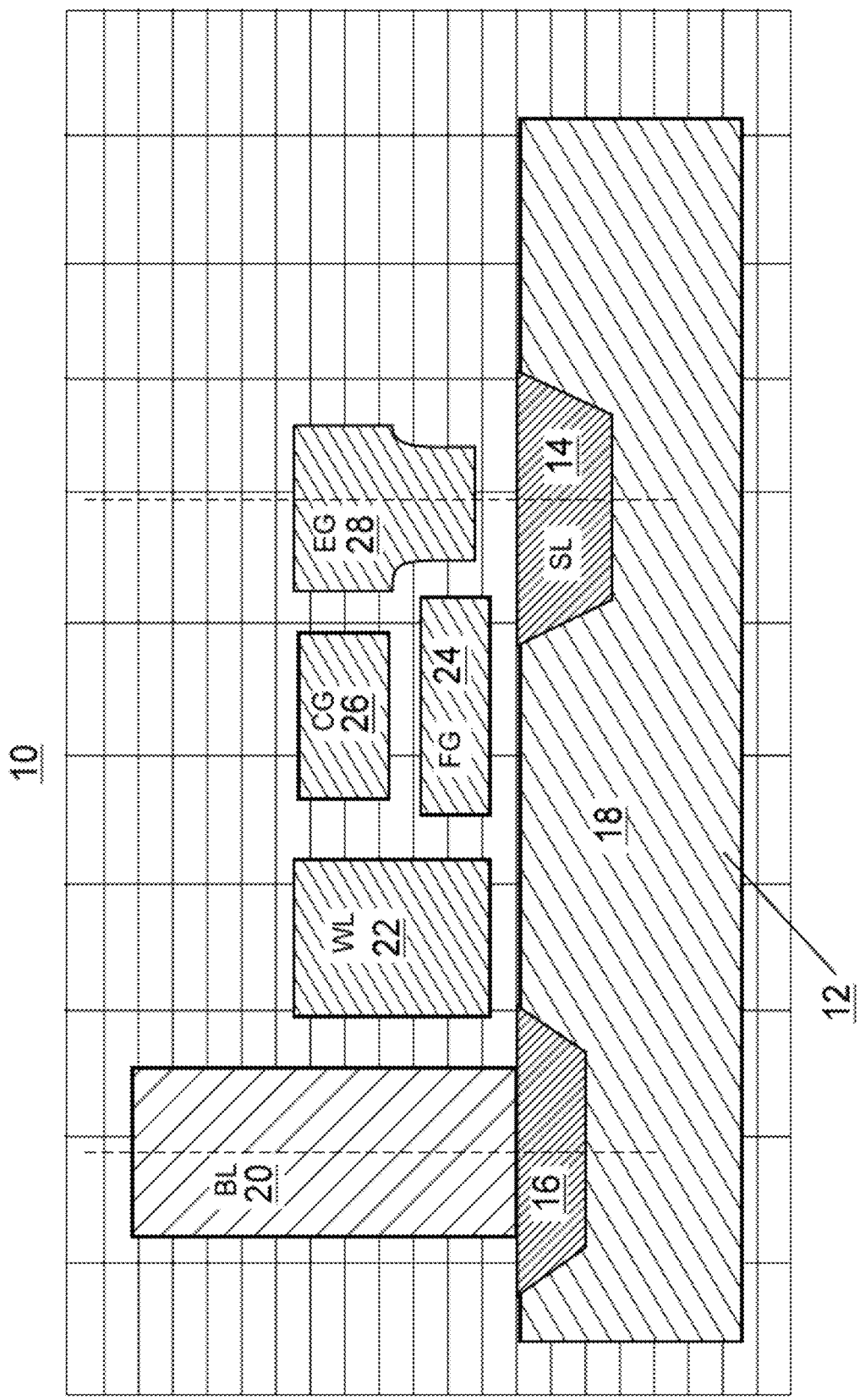
FIG. 1 is a cross-sectional view of a prior art non-volatile memory cell to which the invention can be applied.
Figure 2:
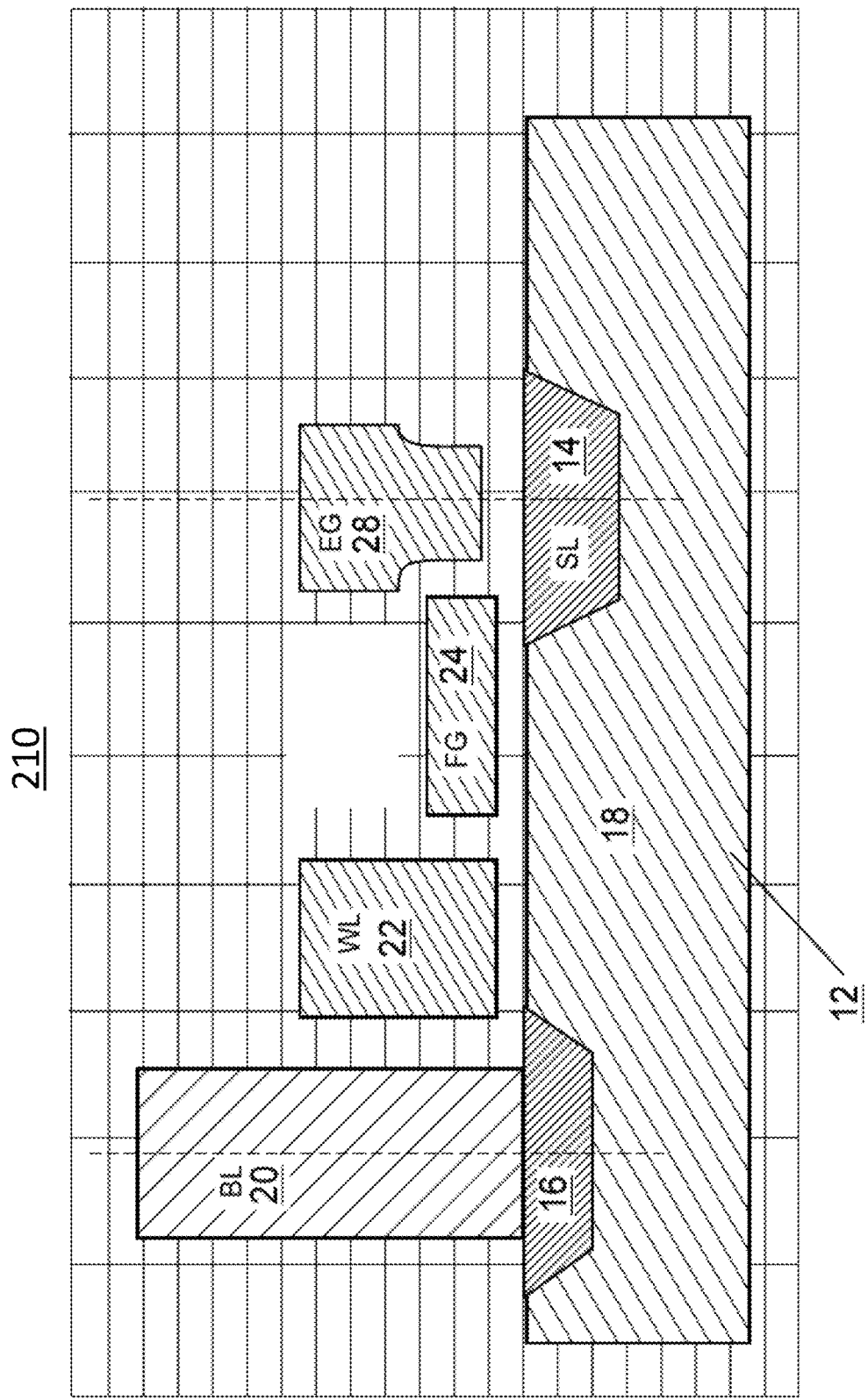
FIG. 2 is a cross-sectional view of another prior art non-volatile memory cell to which the invention can be applied.
Figure 3:
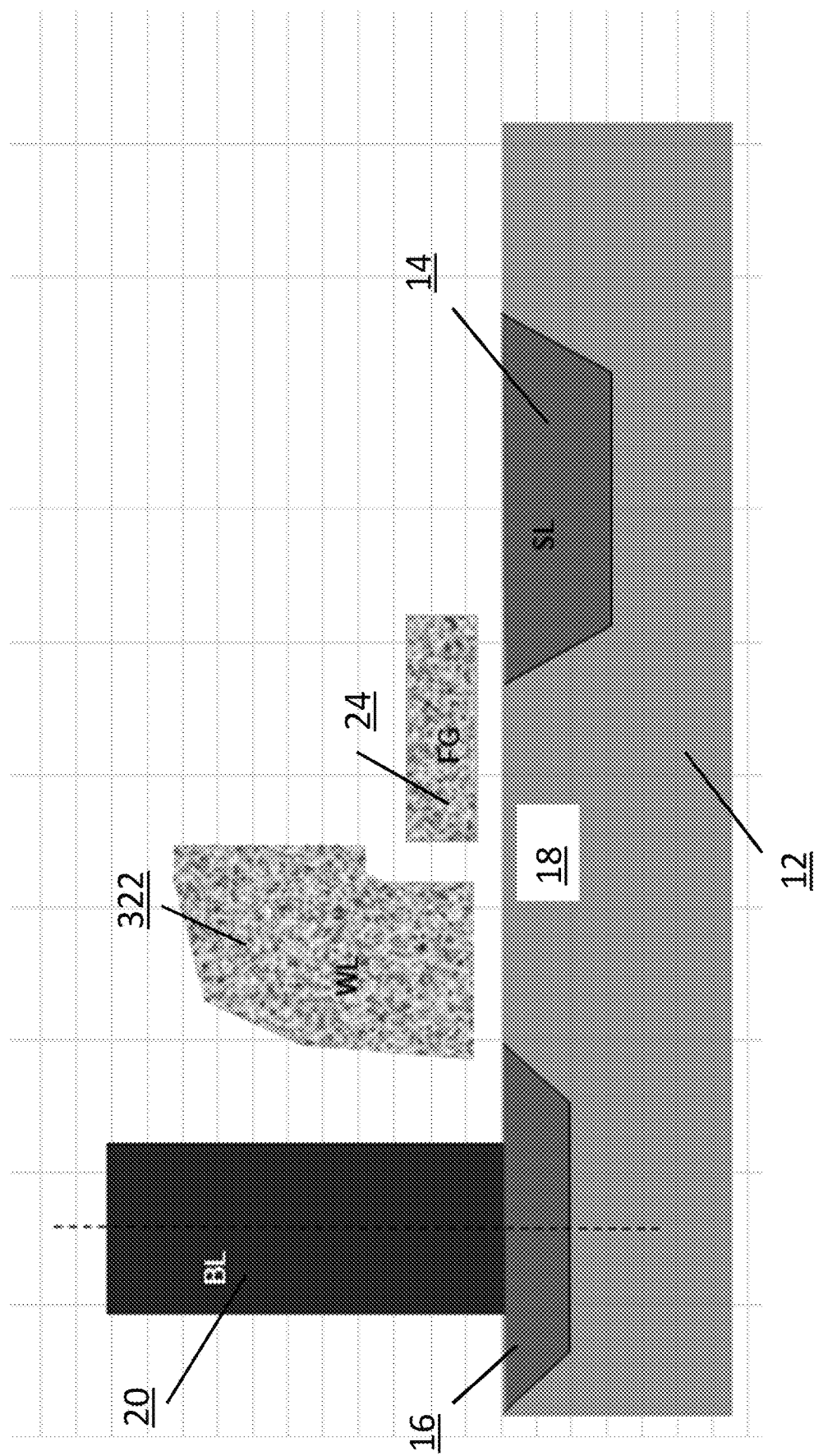
FIG. 3 is a cross-sectional view of another prior art non-volatile memory cell to which the invention can be applied.
Figure 4:
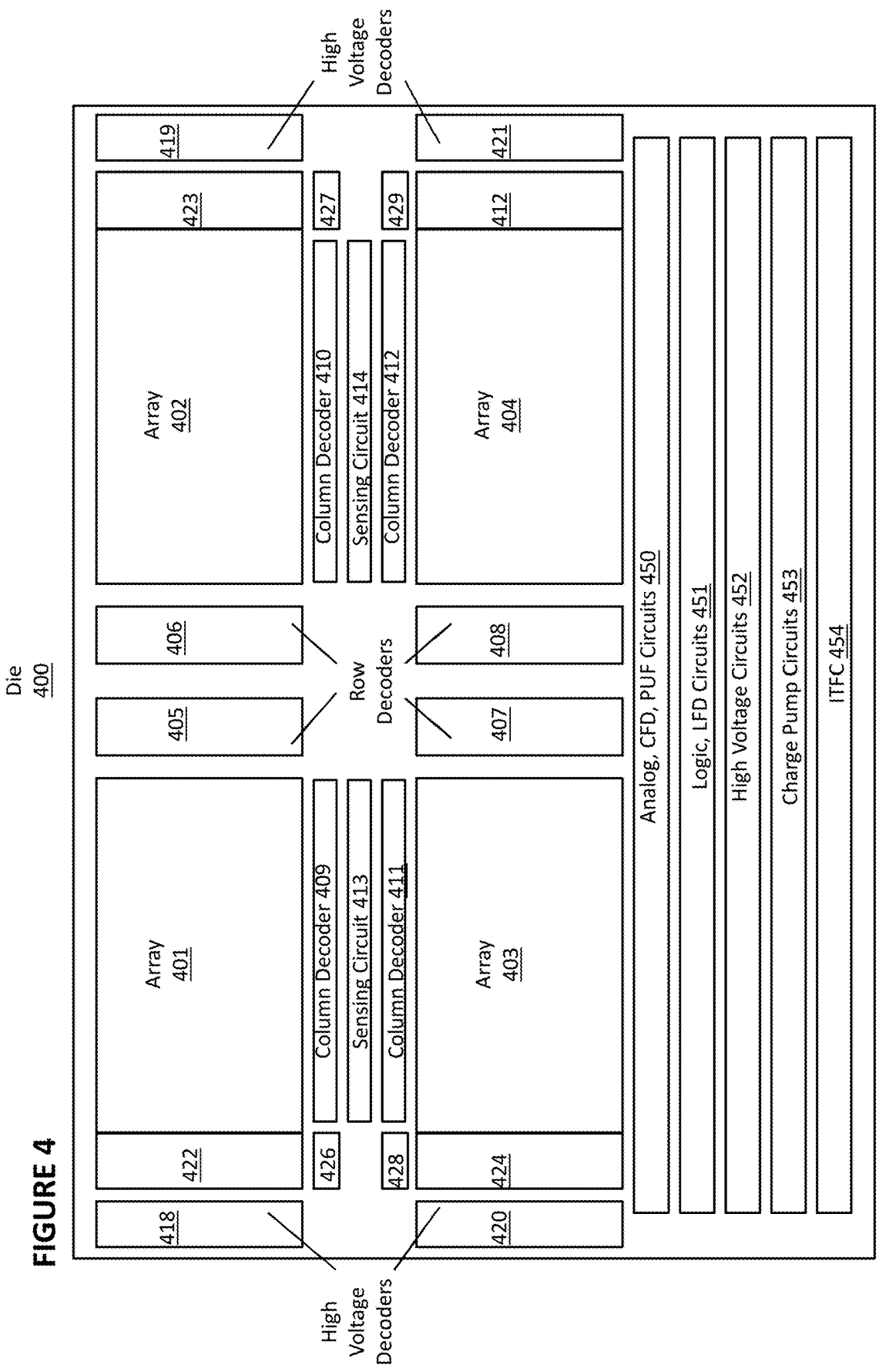
FIG. 4 is a layout diagram of a die comprising non-volatile memory cells of the type shown in FIGS. 1-3 and containing the embodiments described herein for enhancing security of the data stored within the die.

FIG. 4 depicts an embodiment of a flash memory system comprising the security enhancements described herein. Die 400 comprises: memory arrays 401, 402, 403, and 404 for storing data, each memory array optionally utilizing memory cell 4 as in FIG. 1, memory cell 24 as in FIG. 2, memory cell 34 as in FIG. 3, or other known types of memory cells; row decoder circuits 405, 406, 407, and 408 used to access the row in memory arrays 401, 402, 403, and 404, respectively, to be read from or written to; column decoder circuits 409, 410, 411, and 412 used to access the column in memory arrays 401, 402, 403, and 404, respectively, to be read from or written to; sensing circuit 413 used to read data from memory arrays 401 and 403 and sensing circuit 414 used to read data from memory arrays 402 and 404; analog, chip fault detection (CFD), and physically unclonable function (PUF) circuits 450; logic and logic fault detection (LFD) circuits 451 for providing various control functions, such as redundancy and built-in self-testing; high voltage circuits 452 used to provide positive and negative voltage supplies for the system; charge pump circuits 453 to provide increased voltages for erase and program operations for memory arrays 401, 402, 403, and 404; interface circuit (ITFC) 454 to provide interface pins to connect to other macros on chip; and high voltage decoder circuits 418, 419, 420, and 421 used during read, erase, and program operations as needed. Die 400 further comprises address fault detection blocks 422, 423, 424, and 425 and array fault detection sense circuits 426, 427, 428, and 429.

Figure 5:
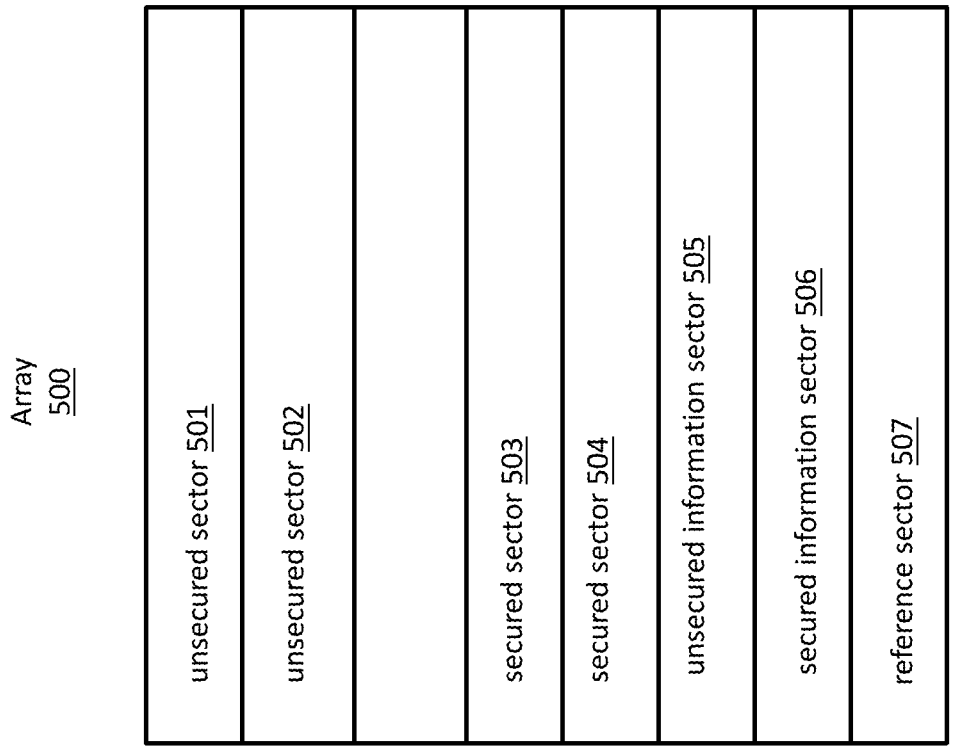
FIG. 5 depicts a flash memory array with secured areas.

A first embodiment is depicted in FIG. 5. Here, certain sectors and information sectors are subject to security measures to make them secured sectors and secured information sectors, respectively. Array 500 is an example of one of memory arrays 401, 402, 403, and 404 for storing data, where array 500 comprises rows and columns of memory cells such as memory cell 4 in FIG. 1, memory cell 24 in FIG. 2, memory cell 34 in FIG. 3, or other known types of memory cells. Array 500 is divided into a plurality of sectors. A sector typically consists of two rows of memory cells in the array. Unsecured sectors 501 and 502 are normal sectors with no added security measure. Secured sectors 503 and 504 are written to and read from using a scrambling algorithm described below.

In one embodiment, sector 507 is never erased or programmed and serves as a source for a random number generator, as described in U.S. Provisional Application No. 62/479,193, filed on Mar. 20, 2017, and titled "System And Method For Generating Random Numbers Based On Non-volatile Memory Cell Array Entropy" ("Random Number Application") which is incorporated herein by reference, and which was filed by the same assignee as the present application. As indicated in the Random Number Application, it has been discovered that by reading memory cells in pairs using differential sensing (which requires 4 memory cells for each bit of information), in subthreshold operation (meaning that the select gates are off so that any detected read current is leakage current only), the leakage current provides a good measure of the randomness of the cells. Each bit value of information is derived from the leakage current of four memory cells, combined onto two bit lines, with the two combined currents being subtracted from each other to yield a positive or negative result reflective of a single bit value. It is the combination of these single bit values for all of the dedicated cells that provide a number that is random (reflecting the randomness of the memory cell fabrication cell-to-cell), is unique to the memory cell array, and can be reliably and repeatably read from the memory cell array. Alternatively, a random number can be generated by a PUF (physically unclonable function) based on an intrinsic characteristic of a flash memory cell, such as coupling ratio variation, dimensional characteristics (e.g., width, length, thickness), and electrical mismatch (such threshold voltage variation). For example, programming or erasing at a fixed voltage for all cells in an array will result in some random cell current levels for different cells. Differential latch sensing can be used with two different cells to establish a random output, basically comparing one cell versus the other. The two cells are strategically placed to maximize entropy. The mismatch between the two cells will result in a random unique number. Multiple cells can be used to represent one super cell to enhance repeatability of the random number generation over variations in process, temperature and voltage. For example, 16 cells can represent one input to the differential amplifier, hence a total of 32 cells are required to generate one random bit.

Here, control logic 451 determines a random number from cells in sector 507 using the invention of the Random Number Application or other techniques, and it utilizes that random number in programming and reading from secured sectors 503 and 504. For example, the random number, R, can be applied to an address as an offset. If a write operation to secured sectors 503 and 504 is intended for Address A, then the write operation might actually occur to a location in the row corresponding to Address A with an offset within the row equal to R*k (where k is a constant for generating an integer value), where the offset simply causes the write to occur in that row but at a cell that is R*k locations to the right of the cell corresponding to Address A (where you simply wrap around to the cell in that row in the first column after the cell in that row in the last column). In this manner, the random number R affects the location of write operations to secured sectors 503 and 504. For read operations from sectors 503 and 504, the same random number R is used to perform an offset to an Address A that is the subject of the read request. Thus, a hacker who wishes to read data from Address A will be unable to do so since he or she will not know the random number R.

In another embodiment, then data is read from secured sectors 503 and 504, optionally random data can be read in parallel from another sector, such that if sense amplifiers are hacked, it will be unclear which data was stored in secured sectors 503 and 504 and which data was the "dummy" random data read from elsewhere.

Metadata or system information typically is stored in array 500 as well. Here, unsecured information sector 505 is a normal information sector with no added security measure. Secured information sector 506 is subject to the same mechanism as secured sectors 503 and 504, the only difference being that secured information sector 506 contains metadata or system information and not user data.

Figure 6:
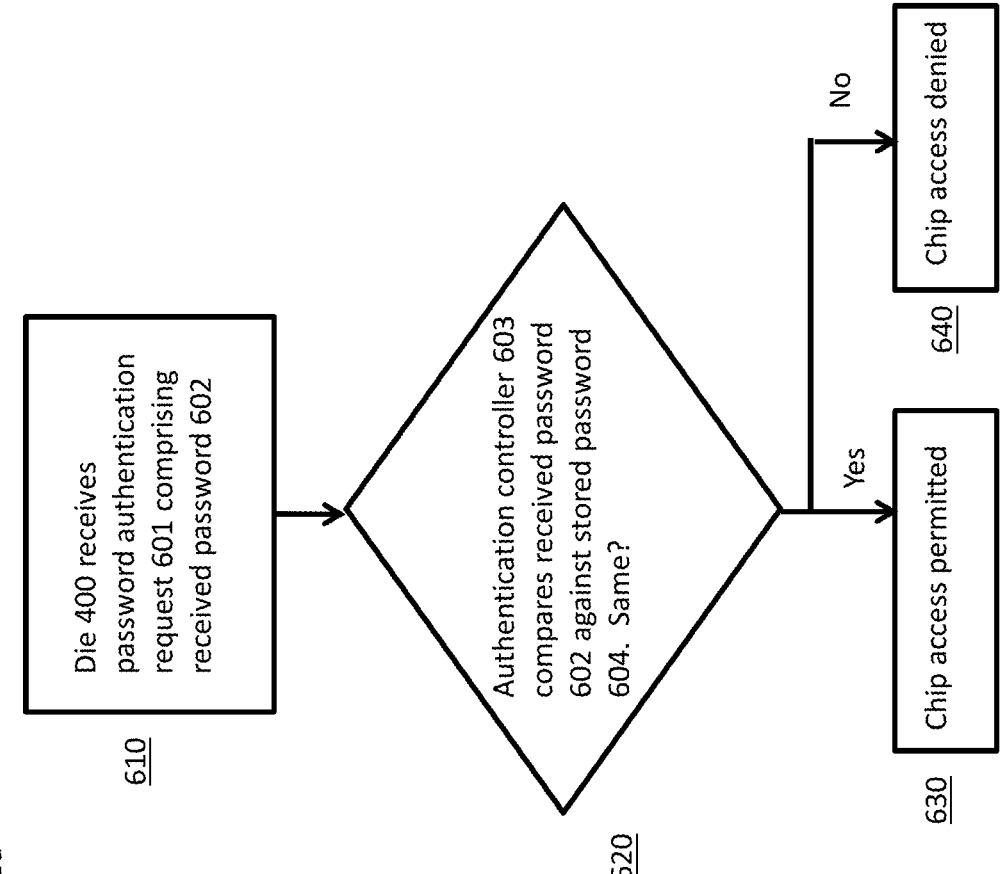
FIG. 6 depicts a password-protected access method for a flash memory device.

FIG. 6 depicts password-protected access method 600, whereby an outside device is allowed to access die 400 for reading or writing only if it provides the password that was previously stored in secured information sector 506. First, die 400 receives password authentication request 601 comprising received password 602 (step 610). Second, authentication controller 603 compares received password 602 against stored password 604 (step 620). Here, authentication controller 603 can be part of logic circuit 451, and stored password 604 was previously stored in secured information sector 506 or elsewhere in die 400 during the manufacturing of die 400, during the initial configuration of die 400, or be a user during the first use of die 400. If received password 602 is the same as stored password 604, then die 400 permits the access requested by the outside device (step 630). If received password 602 is not the same as stored password 604, then die 400 does not permit the access requested by the outside device (step 640). Optionally, access to secured information sector 506 can be disabled after stored password 604 is initially stored there, for example, by setting an OTP bit. Optionally, stored password 604 can be encrypted and decrypted by authentication controller 603 using a unique key generated by a PUF (physically unclonable function) based on variation of non-volatile memory such as described in the Random Number Application or as described above.

Figure 7:
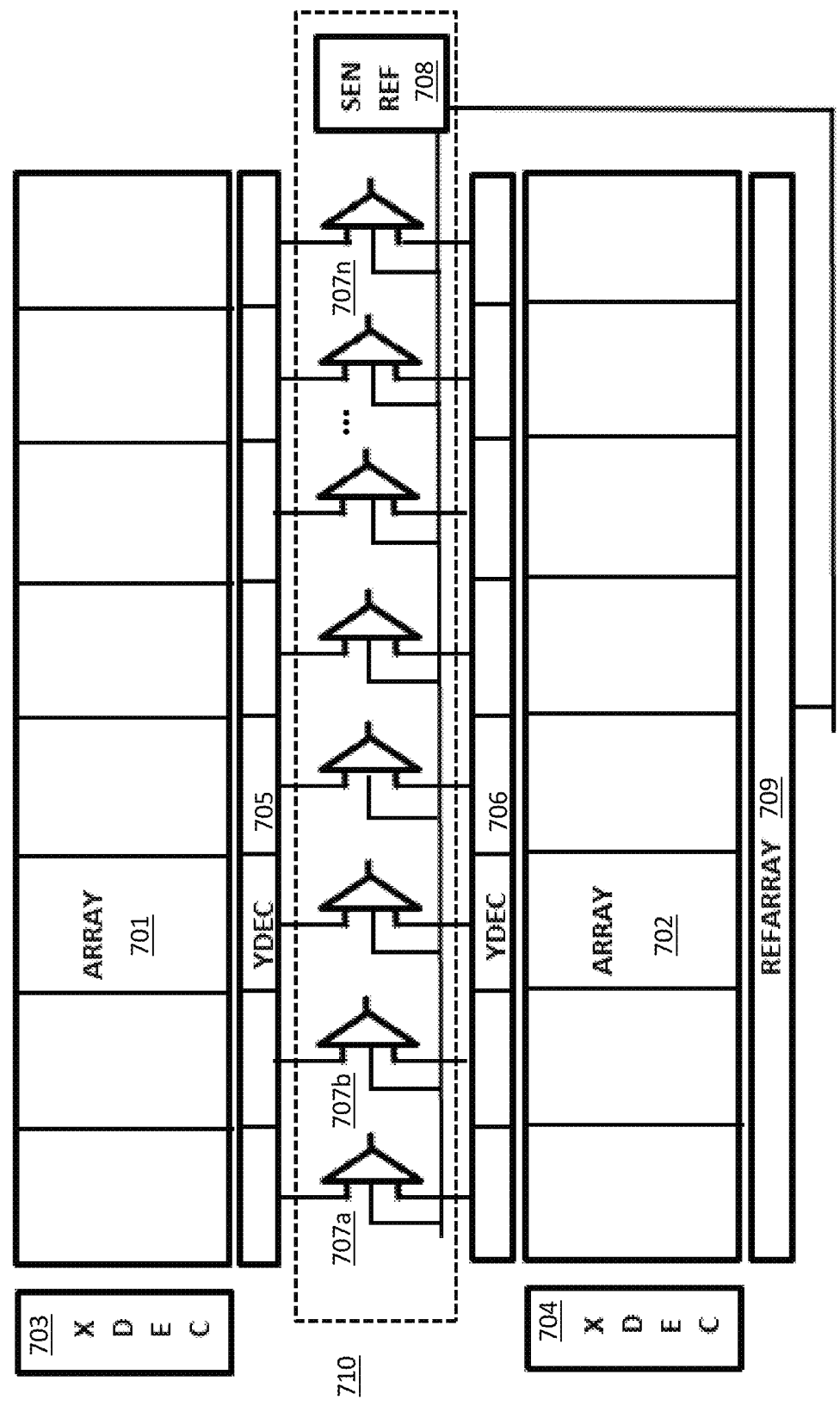
FIG. 7 depicts a flash memory system.

FIG. 7 depicts a flash memory system 700 (which can be implemented on die 400). Flash memory system 700 comprises arrays 701 and 702 (corresponding to arrays 401 and 403 in FIG. 4), row decoders 703 and 704 (corresponding to row decoders 405 and 406), column decoders 705 and 706 (corresponding to column decoders 406 and 408), and sensing circuit 710 (corresponding to sensing circuit 410). Flash memory system 700 further comprises reference array 709 and sensing circuit current reference 708.

Each column of flash memory cells in array 701 is coupled to a bit line, such that there is one bit line for every column in array 701. Similarly, each column of flash memory cells in array 702 is coupled to a bit line, such that there is one bit line for every column in array 702. Column decoders 705 and 706 connect selected bit lines to sensing circuit 710 during a read operation for a selected address. Sensing circuit 710 comprises a plurality of sense amplifier circuits 707a, 707b, . . . 707n, where n is the number of bit lines that can be read concurrently and is referred to as the IO width of flash memory system 700 (typically, n is 32 or 64). These sense amplifier circuits will be referred to collectively as sense amplifier circuits 707.

In this embodiment, reference array 709 is an array of dummy flash memory cells that are identical in structure to the flash memory cells of arrays 701 and 702 but which are not actually used to store user data. The reference array 709 serves to generate read reference bias for sensing both arrays 701 and 702. In an alternative embodiment, reference array 709 comprises regular reference transistors without flash memory cells. These regular reference transistors are sized and/or biased differently to provide different trip points (i.e., the current or voltage level that demarcates a "1" from a "0") for the sensing circuit 710. In another alternative embodiment, reference array 709 comprises regular reference resistors without flash memory cells. These regular reference resistors are sized differently to provide different trip points for the sensing circuit 710.

Sensing circuit current reference 708 is coupled to one or more of the dummy flash memory cells and generates a current. Using current mirror techniques, that current is mirrored in each of the sense amplifier circuits 707. The mirrored reference current is them compared against a selected memory cell from array 701 or 702 to generate an output that indicates the value of the data stored in the selected memory cell.

Figure 8:
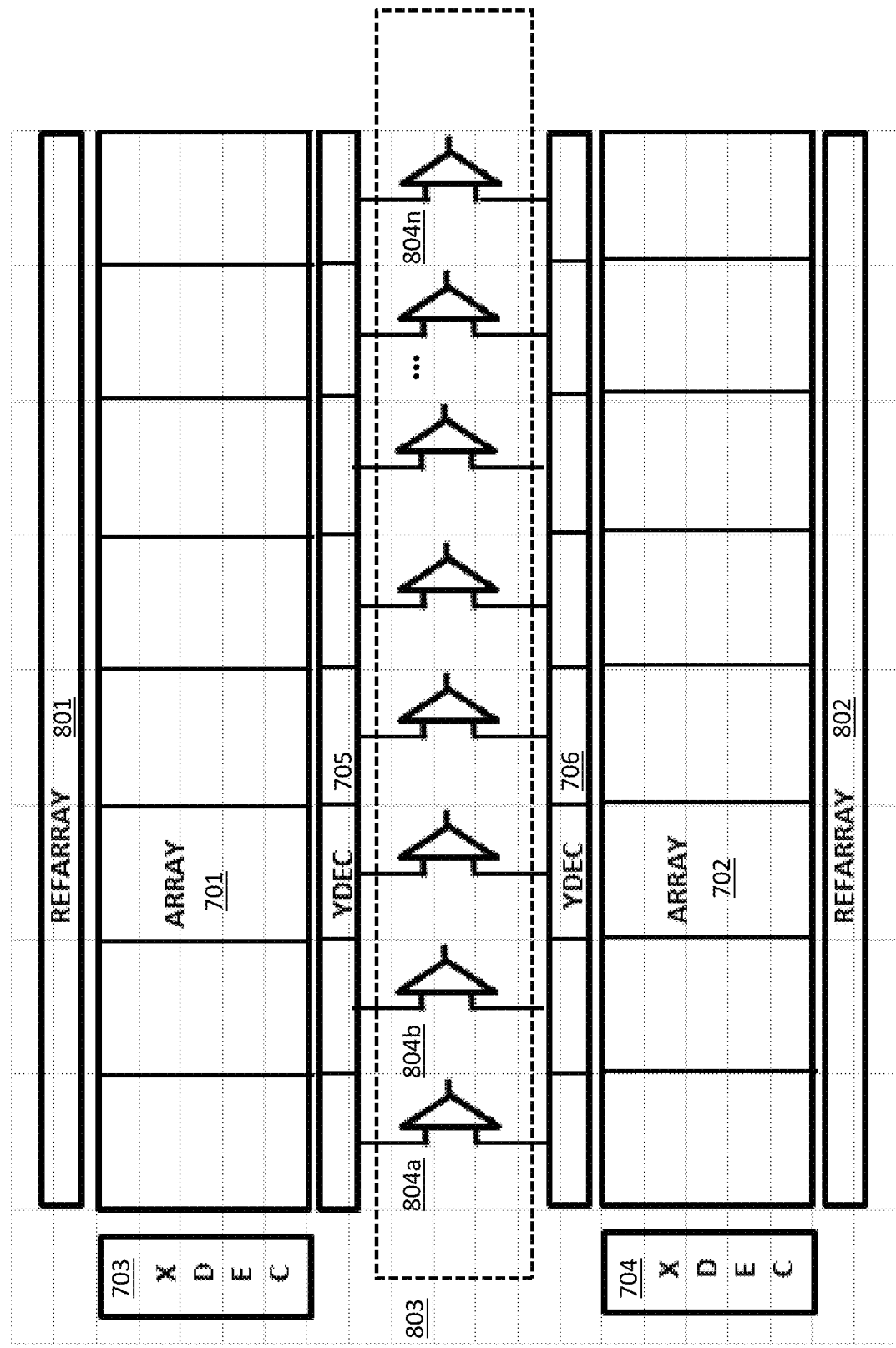
FIG. 8 depicts another flash memory system.

FIG. 8 depicts another flash memory system 800 (which can be implemented on die 800). Flash memory system 800, like flash memory system 700, comprises arrays 701 and 702, row decoders 703 and 704, and column decoders 705 and 706. Flash memory system 800 further comprises reference arrays 801 and 802 and sensing circuit 803.

Each column of flash memory cells in array 701 is coupled to a bit line, such that there is one bit line for every column in array 701. Similarly, each column of flash memory cells in array 702 is coupled to a bit line, such that there is one bit line for every column in array 702. Column decoders 705 and 706 connect selected bit lines to sensing circuit 803 during a read operation for a selected address. Sensing circuit 803 comprises a plurality of sense amplifier circuits 804a, 804b, . . . 804n, where n is the number of bit lines that can be read concurrently and is referred to as the IO width of flash memory system 800 (typically, n is 32 or 64). These sense amplifier circuits will be referred to collectively as sense amplifier circuits 804.

In this embodiment, reference arrays 801 and 802 both are an array of dummy flash memory cells that are identical in structure to the flash memory cells of arrays 701 and 702 but which are not actually used to store user data. When the selected memory cells are in array 701, each sense amplifier circuit 804 will be connected to a memory cell in reference array 802, where that memory cell will act as a reference memory cell. When the selected memory cells are in array 702, each sense amplifier circuit 804 will be connected to a memory cell in reference array 801 that will act as a reference memory cell. Thus, unlike flash memory system 700, flash memory system 800 does not require sensing circuit current reference 708 or the use of current mirrors. In another alternative embodiment, reference arrays 801 and 802 comprise regular reference transistors without flash memory cells. These regular reference transistors are sized and/or biased differently to provide different trip points for the sensing circuit 803. In another alternative embodiment, the reference arrays 801 and 802 comprise regular reference resistors without flash memory cells. These regular reference resistors are sized differently to provide different trip points for the sensing circuit 803.

Figure 9:
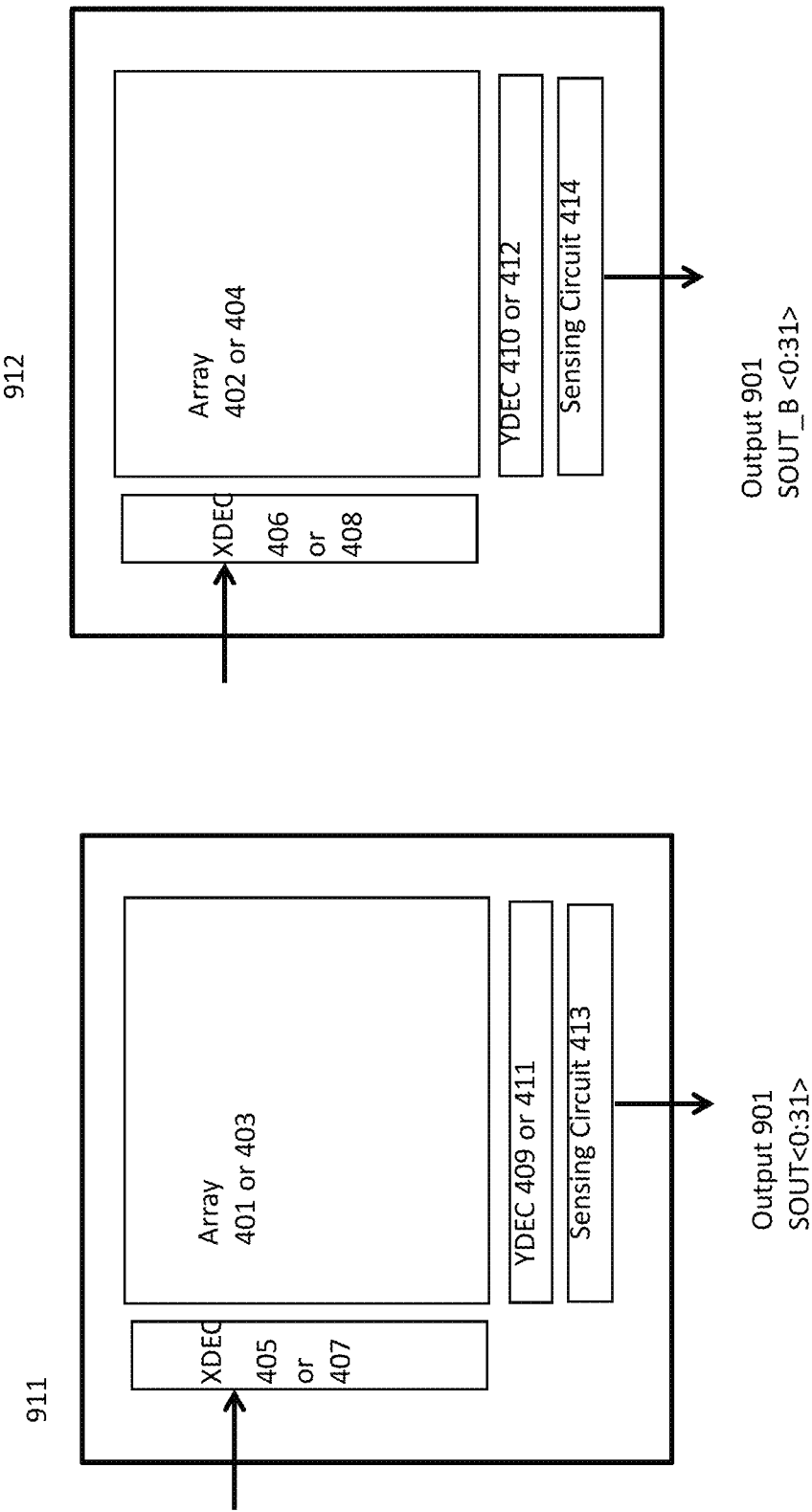
FIG. 9 depicts complementary arrays in a flash memory system.

FIG. 9 depicts a system and method of system power balancing for providing security against a situation where a hacker is monitoring a signature of the power consumption such as by utilizing Side Channel Attack techniques using Simple Power Analysis SPA or Differential Power Analysis DPA) of die 400 or certain components within die 400 in an attempt to determine the data that is stored within the arrays. Specifically, in prior art flash memory systems, a hacker could discern the data being read by a sensing circuit based on the power consumption of each read cycle. For example, a different amount of power will be consumed for reading a "1" from a flash memory cell compared to reading a "0" from a flash memory cell. Thus, by monitoring the power consumption of a sensing circuit, one could deduce the values of the cells being read, and therefore could deduce the data that was being read from the array.

In the system of FIG. 9, when Data D is written to Address A in array 401 or 403, the complement of that data, DATA D-bar, is written to Address A in array 402 or 404. Thereafter, when data is read from Address A in arrays 401 or 403, data also is read concurrently from Address A in arrays 402 or 404. Because the data stored in the two arrays at the same address necessarily are complements of one another, for each read operation, both a "1" and a "0" will be read, and the combined power consumption of sensing circuits 413 and 414 will be the same for every read operation. A hacker therefore will not be able to determine the data that is read from any of the arrays simply by monitoring the power consumed by sensing circuits 413 and 414. The above power balancing approach can be applied at the system level where there are multiple instances of flash memory macros that are being used. In this case, DATA D is stored in one instance and DATA D-bar is stored in another instance and both DATA D and DATA D-bar are being activated in a read operation at the same time.

Figure 10:
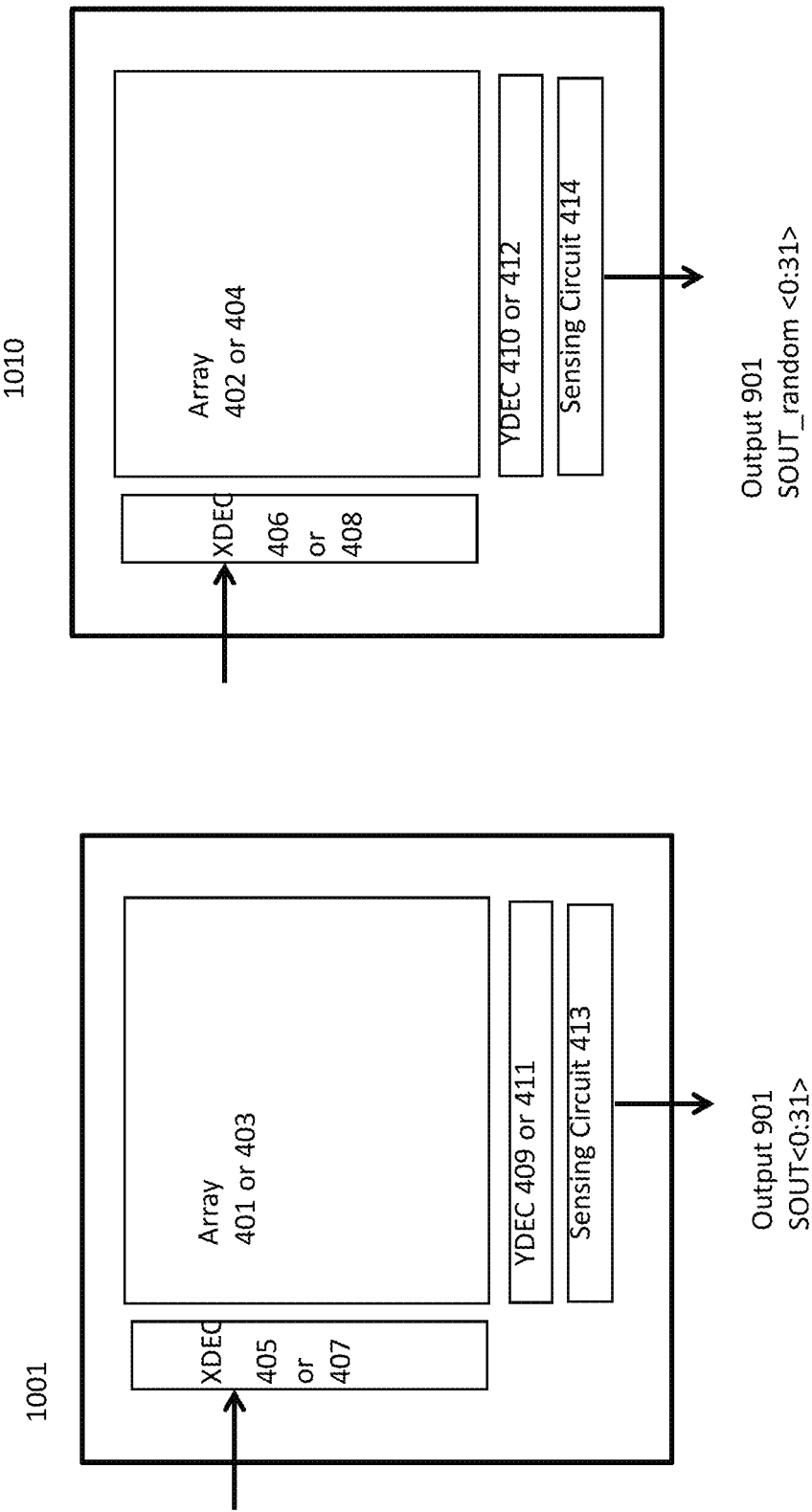
FIG. 10 depicts a memory array with a separate component for adding noise to a read operation.

FIG. 10 depicts memory array and noise component 1000. Here, data is written into array 401 or 403 as in the prior art. However during a read operation, sensing circuit 413 reads the data from array 401 or 403, and sensing circuit 414 reads concurrently random data from an address in array 402 or 404. Thus, the combined power consumption of sensing circuits 413 and 414 will include a component attributable to the data being read from array 401 or 403 and a component attributable to a "0" or "1" being read from a random data in array 402 or 404. As a result, a hacker will be unable to discern all of the data being read from array 401 or 403 based on the power consumption of sensing circuits 413 and 414 due to the random data read from array 402 or 404, particularly in the situation where a "1" and "0" or a "0" and "1" are read by sensing circuits 413 and 414. In an embodiment that includes multiple instances of flash memory macros, only one flash memory macro is needed to store the random data. The macro with random data is activated in parallel when reading data from any other flash memory macros.

Figure 11:
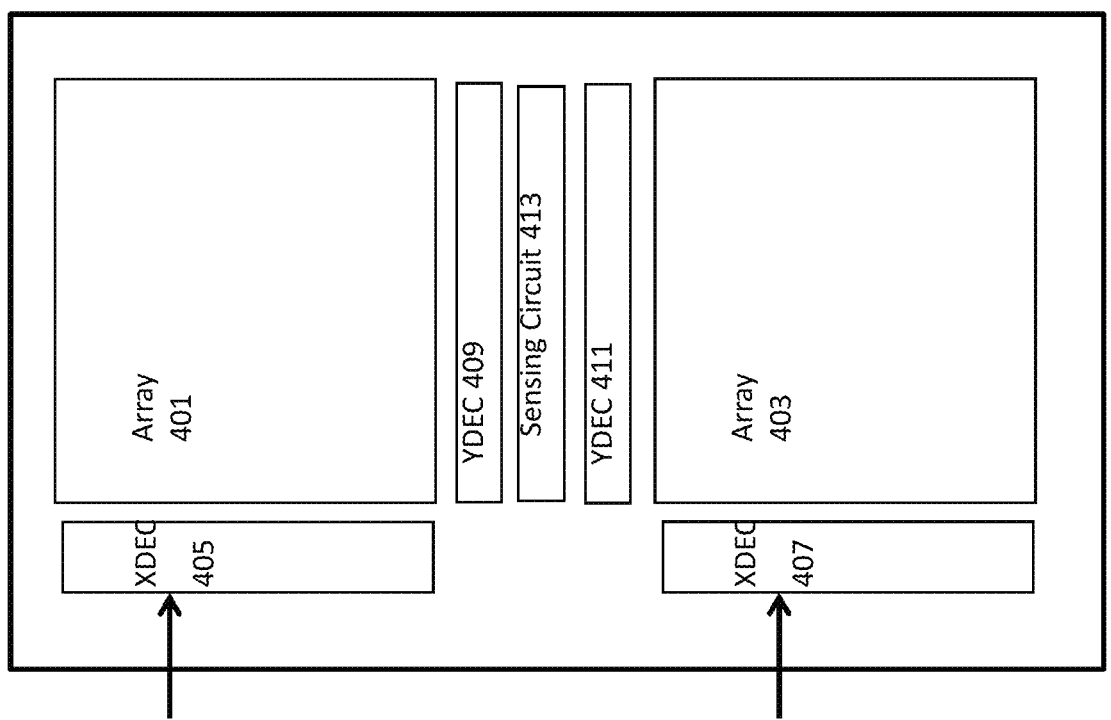
FIG. 11 depicts differential memory arrays in a flash memory system.

FIG. 11 depicts differential memory arrays 1100. Here, the arrays are arrays 401 and 403 from FIG. 4. It is to be understood that the arrays also could be arrays 402 and 404 and their associated circuitry, or any other pair of arrays. In the system of FIG. 11, when Data D is written to Address A in array 401, the complement of that data, DATA D-bar, is written to Address A in array 403. Thereafter, when data is read from Address A in array 401 or 403, data also is read concurrently from Address A in array 403. Because the data stored in the two arrays at the same address necessarily are complements of one another, for each read operation, both a "1" and a "0" will be read, and the power consumption of sensing circuit 413 will be the same for every read operation. A hacker therefore will not be able to determine the data that is read from any of the arrays simply by monitoring the power consumed by sensing circuit 413.

Figure 12:
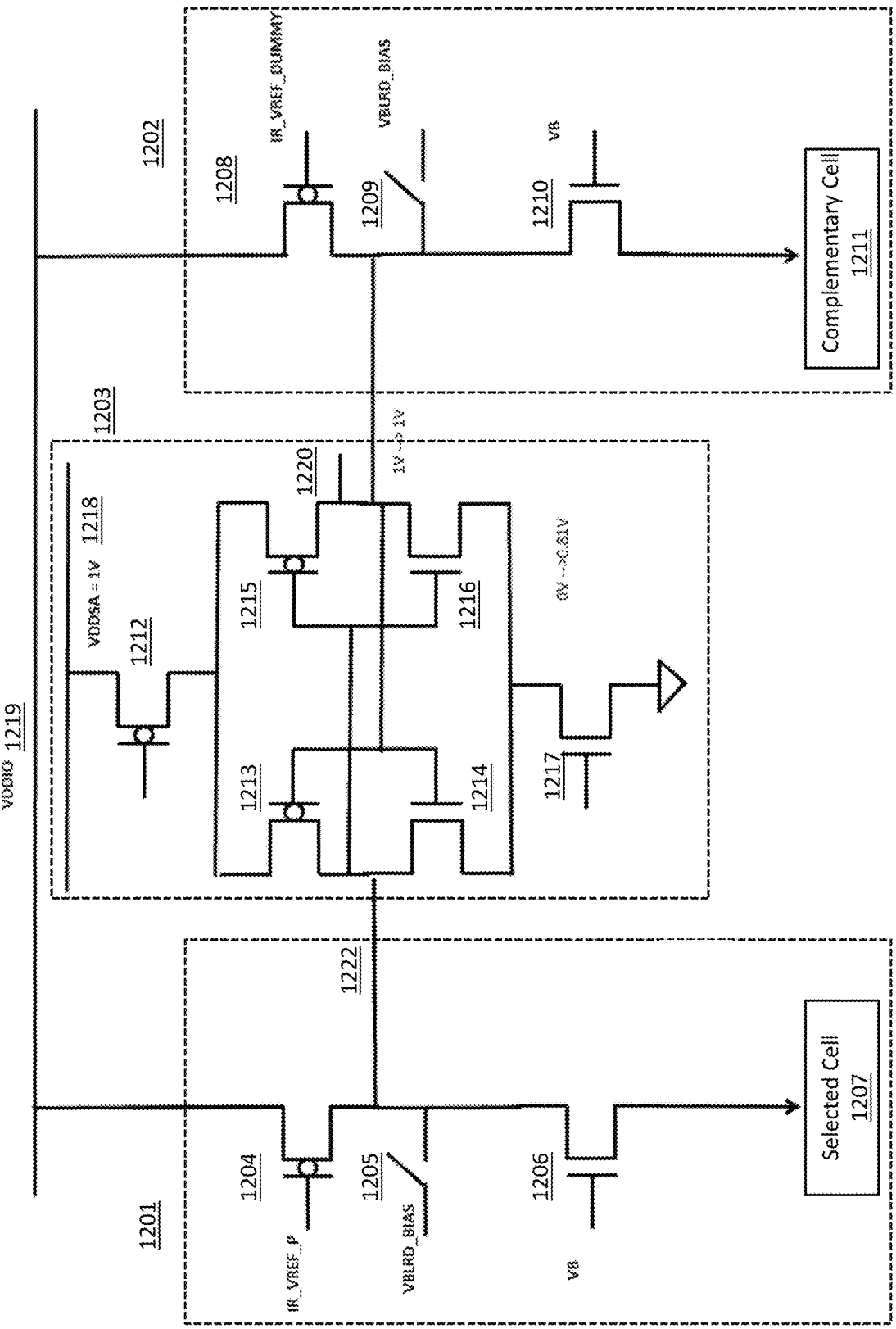
FIG. 12 depicts a sense amplifier circuit in a flash memory system.

FIG. 12 depicts exemplary circuitry for sensing circuit 413. Sense amplifier circuit 1200 comprises memory data read block 1201, memory reference read block 1202, and differential amplifier block 1203.

Memory data read block 1201 comprises sensing load PMOS transistor 1204, switch 1205 to apply a bias voltage VBLRD_BIAS to sensing node 1222, and enabling sensing NMOS transistor 1206 coupled to selected memory cell 1207. Sensing load PMOS transistor 1204 provides a read reference current to be compared versus the cell current from memory cell 1207. The sensing node 1222 goes high (toward VDDIO 1219) if the read reference current from sensing load PMOS transistor 1204 is larger than the memory cell current and goes low (toward ground) if the memory cell current is larger than the read reference current. The reference current from sensing load PMOS transistor 1204 optionally can be provided using a current mirror configuration whereby it a current from a reference memory cell. Alternatively, the reference current from sensing load PMOS transistor 1204 can be provided using a current mirror configuration whereby it mirrors a current from a reference resistor or a reference transistor, appropriately sized or biased.

Memory reference read block 1202 comprises sensing load PMOS transistor 1208, switch 1209 to apply a bias voltage VBLRD_BIAS on reference node 1220, and enabling sensing NMOS transistor 1201 coupled to complementary memory cell 1211. Complementary memory cell 1211 serves as a holding capacitor to hold the reference voltage VBLRD_BIAS on the sensing node 1220. Alternatively, an explicit capacitor such as a MOMCAP (metal oxide metal cap) can be used as a holding capacitor. Alternatively, parasitic capacitances such as from a junction capacitance or a gate capacitance on node 1220 can be used as a holding capacitor. The reference block 1202 serves as a dummy block for reference node 1220. The reference sensing load PMOS transistor 1208 may be in an off state or may be used to provide a compensatory leakage current such as for leakage on node 1220 from junction and/or transistor leakage on an un-selected bitline. The bias voltage level on VBLRD_BIAS serves as a reference voltage on reference node 1220 to be compared against sensing voltage on the sensing node 1222.

Differential amplifier block 1203 comprises input cross coupled PMOS transistors 1213 and 1215 and input cross coupled NMOS transistors 1214 and 1216 together forming a comparator, PMOS enabling transistor 1212 (which also acts as a transient bias tail current for the cross coupled PMOS transistor 1213 and 1215), and NMOS enabling transistor 1217 (which also acts as a transient bias tail current for the cross coupled NMOS transistors 1214 and 1216). In comparison, the NMOS transistor 1217 is enabled first to trigger the comparison from the NMOS transistors 1214 and 1216 to develop a voltage delta between node 1220 and 1222, and then the PMOS transistor 1212 is enabled to start the comparison from the PMOS transistors 1213 and 1220, which restores the full power supply to both nodes 1220 and 1222. Alternatively, both NMOS transistor 1217 and PMOS transistor 1212 can be enabled simultaneously to trigger the comparison.

During operation, differential amplifier block 1203 will compare sensing node 1222 created by memory data read block 1201 and reference node 1220 created by memory reference read block 1202 to generate output 1220. Initially, the voltages on nodes 1222 and 1220 are initialized at the same reference voltage level VBLRD_BIAS (by the switches 1205 and 1209). Then the voltage on sensing node 1222 is developed (going high or low depending on the selected memory cell current 1207 is less or more than the read reference current conducting in the PMOS transistor 1204). Then the comparison is triggered to compare the voltage on sensing node 1222 versus the voltage on reference node 1220 (by transistors 1217 and 1212). The final voltage on sensing node 1222 and reference node 1220 is at full supply level after the comparison is completed.

If the read reference current conducting in transistor 1204 exceeds the memory cell current drawn from memory cell 1207 (signifying that a "0" is stored in the selected memory cell), then output 1220 will be low. If the read reference current in transistor 1204 is less than the memory cell current drawn from memory cell 1207 (signifying that a "1" is stored in the selected memory cell), then output 1220 will be high.

Memory data read block 1201 and memory reference read block 1202 draw power from power bus 1219 (also labeled VDDIO, i.e., IO power supply), which typically is around 3.0 volts. Differential amplifier block 1203 draws power from power bus 1218 (also labeled VDDSA, typically core logic power supply), which typically is around 1.05 volts or lower for scaled technology node such as 28 nm or smaller. To get high memory cell current for high performance requirements, the read bitline voltage needs to be as high as possible, meaning the voltage on node 1222 needs to be high, such as 1v to 1.4v. This means transistor 1204 needs to work from a voltage supply that is much higher than the core logic supply of typically <=1.05v. Hence, circuit blocks 1201 and 1202 need to work at IO supply, which is much higher than the core logic supply. This means circuit blocks 1201 and 1202 will include 3v IO transistors, which require a relatively large area.

In another method of operation for sensing circuit 1200, sensing circuit 1200 operates as a differential sensing circuit with two complementary cells as follows. The sensing load PMOS transistor 1204 of the memory data read block 1201 may be in an off state or may be used to provide a compensatory leakage current such as for leakage on node 1222 from junction and/or transistor leakage on a selected bitline. The switch 1205 is used to pre-charge the sensing node 1222 to a bias voltage VBLRD_BIAS. In the meantime, the switch 1209 is used to pre-charge the reference node 1220 to the bias voltage VBLRD_BIAS. The complementary memory cell 1211 is now coupled to anther memory cell that has its data complementary to that of the selected cell 1207. After the pre-charging period, for example for the case when the selected cell 1207 data is '1' and the complementary cell 1211 data is '0', the sensing node 1222 and reference node 1220 will both discharge towards ground with the sensing node 1222 being faster. At certain time during the ramping down, the comparator circuit 1203 is enabled to compare the sensing node 1222 versus the reference node 1220. For the above case when the selected cell 1207 data is '1' and the complementary cell 1211 data is '0', the sensing node 1222 will go to ground and the reference node 1220 will go towards VDDSA. In this case, the entire circuit 1200 only needs to operate from the VDDSA supply (core logic supply). This method is a preferred method to apply to the differential memory array 1100.

Figure 13:
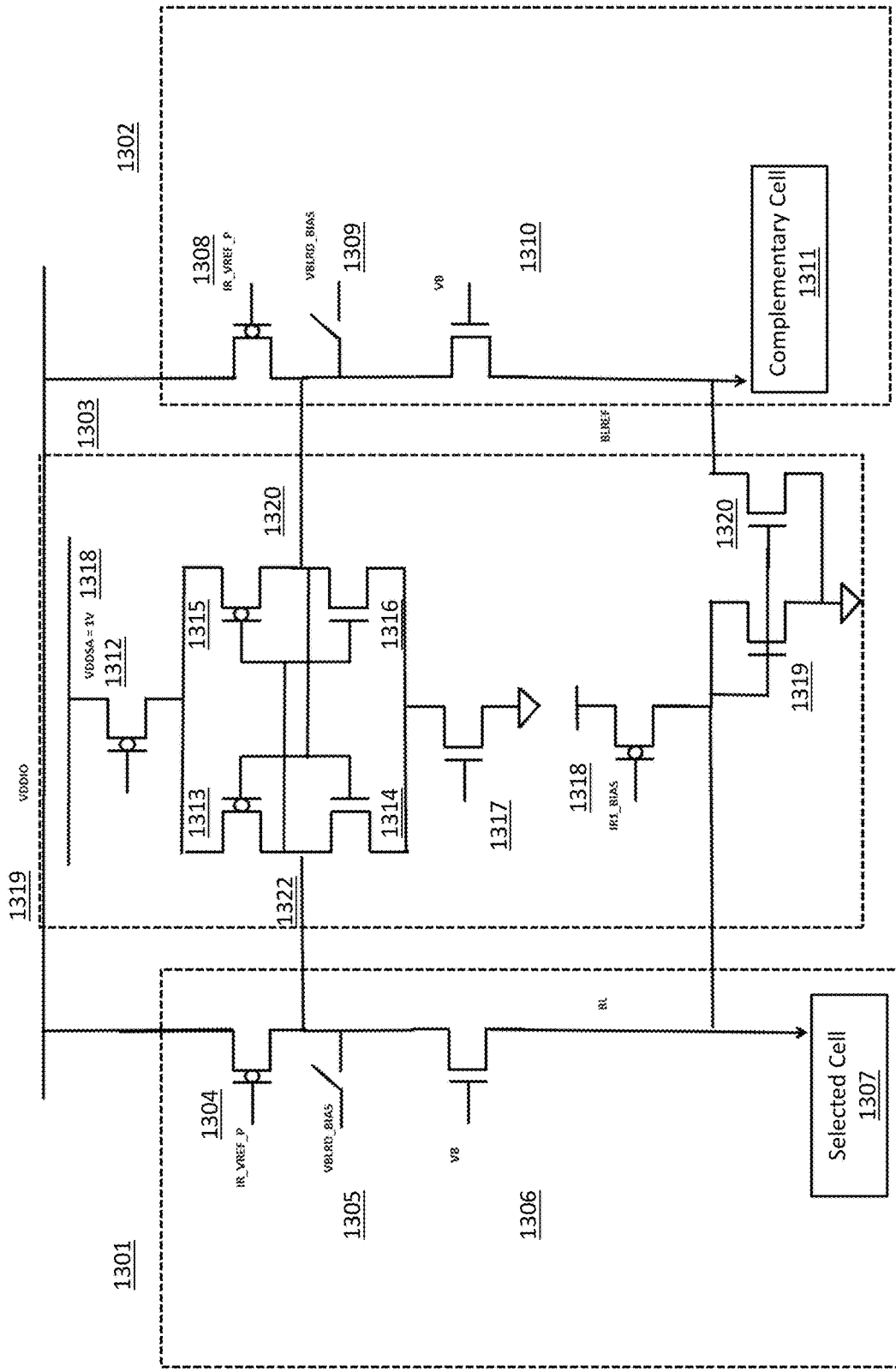
FIG. 13 depicts another sense amplifier circuit in a flash memory system.

FIG. 13 depicts a power balancing circuitry for sensing circuit 413. Sense amplifier circuit 1300 comprises memory data read block 1301, memory reference read block 1302, and differential amplifier block 1303. The sensing circuit 1300 is a balanced (constant) power differential latch sensing circuit that provides a balanced power in response to any data pattern.

Memory data read block 1301 comprises sensing load PMOS transistor 1304, switch 1305 to apply a bias voltage VBLRD_BIAS to sensing node 1322, and enabling sensing NMOS transistor 1306 coupled to selected memory cell 1307. Sensing load PMOS transistor 1304 provides a read reference current to be compared versus the cell current from memory cell 1307. The sensing node 1322 goes high (toward VDDIO 1319) if the read reference current from sensing load PMOS transistor 1304 is larger than the memory cell current and goes low (toward ground) if the memory cell current is larger than the read reference current. The reference current from sensing load PMOS transistor 1304 optionally can be provided using a current mirror configuration whereby it a current from a reference memory cell. Alternatively, the reference current from sensing load PMOS transistor 1304 can be provided using a current mirror configuration whereby it mirrors a current from a reference resistor or a reference transistor, appropriately sized or biased.

Memory reference read block 1302 comprises sensing load PMOS transistor 1308, switch 1309 to apply a bias voltage VBLRD_BIAS on reference node 1320, and enabling sensing NMOS transistor 1301 coupled to complementary memory cell 1311. Complementary memory cell 1311 serves as a holding capacitor to hold the reference voltage VBLRD_BIAS on the sensing node 1320. Alternatively, an explicit capacitor such as a MOMCAP (metal oxide metal cap) can be used as a holding capacitor. Alternatively, parasitic capacitances such as from a junction capacitance or a gate capacitance on node 1320 can be used as a holding capacitor. The reference block 1302 serves as a dummy block for reference node 1320. The reference sensing load PMOS transistor 1308 may be in an off state or may be used to provide a bias current including a reference current and a compensatory leakage current such as for leakage on node 1320 from junction and/or transistor leakage on an un-selected bitline. The bias voltage level on VBLRD_BIAS serves as a reference voltage on reference node 1320 to be compared against sensing voltage on the sensing node 1322.

Differential amplifier block 1303 comprises input cross coupled PMOS transistors 1313 and 1315 and input cross coupled NMOS transistors 1314 and 1316 together forming a comparator, PMOS enabling transistor 1312 (which also acts as a transient bias tail current for the cross coupled PMOS transistor 1313 and 1315), and NMOS enabling transistor 1317 (which also acts as a transient bias tail current for the cross coupled NMOS transistors 1314 and 1316). In comparison, the NMOS transistor 1317 is enabled first to trigger the comparison from the NMOS transistors 1314 and 1316 to develop a voltage delta between node 1320 and 1322, and then the PMOS transistor 1313 is enabled to start the comparison from the PMOS transistors 1313 and 1320, which restores the full power supply to both nodes 1320 and 1322. Alternatively, both NMOS transistor 1317 and PMOS transistor 1312 can be enabled simultaneously to trigger the comparison.

Differential amplifier block 1303 further comprises PMOS transistor 1318 and NMOS transistors 1319 and 1320, which together that form a balancing power circuit that can provide a balanced power for the sensing circuit 1300 in response to any data pattern. The transistor 1319 is sized such that voltage level on the sensing node 1322 is less than voltage level on reference node 1320 when the selected cell 1307 is in an erased state (memory cell conducting large current).

During operation, differential amplifier block 1303 will compare sensing node 1322 created by memory data read block 1301 and reference node 1320 created by memory reference read block 1302 to generate output 1320. Initially, the voltages on nodes 1322 and 1320 are initialized at the same reference voltage level VBLRD_BIAS (by the switches 1305 and 1309). Then the voltage on sensing node 1322 is developed more or less than reference node 1320 (depending on the selected memory cell current 1307 versus the read reference current conducting in the PMOS transistor 1304). Then the comparison is triggered to compare the voltage on sensing node 1322 versus the voltage on reference node 1320 (by transistors 1317 and 1313). The final voltage on sensing node 1322 and reference node 1320 is at full supply level after the comparison is completed.

If the read reference current conducting in transistor 1304 exceeds the memory cell current drawn from memory cell 1307 (signifying that a "0" is stored in the selected memory cell), then output 1320 will be low. If the read reference current in transistor 1304 is less than the memory cell current drawn from memory cell 1307 (signifying that a "1" is stored in the selected memory cell), then output 1320 will be high.

Memory data read block 1301 and memory reference read block 1302 draw power from power bus 1319 (also labeled VDDIO, i.e., IO power supply), which typically is around 3.0 volts. Differential amplifier block 1303 draws power from power bus 1318 (also labeled VDDSA, typically core logic power supply), which typically is around 1.05 volts or lower for scaled technology node such as 28 nm or smaller. To get high memory cell current for high performance requirements, the read bitline voltage needs to be as high as possible, meaning the voltage on node 1322 needs to be high, such as 1v to 1.4v. This means transistor 1304 needs to work from a voltage supply that is much higher than the core logic supply of typically <=1.05v. Hence, circuit blocks 1301 and 1302 need to work at IO supply, which is much higher than the core logic supply. This means circuit blocks 1301 and 1302 will include 3v IO transistors, which require a relatively large area.

Figure 14:
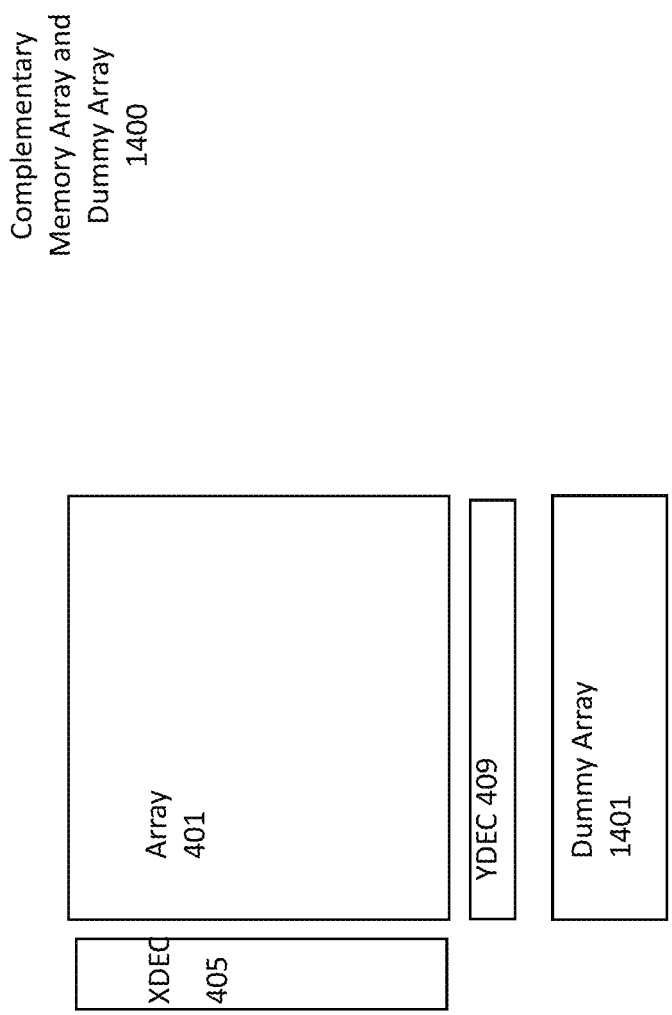
FIG. 14 depicts a complementary memory array and dummy array.

FIG. 14 depicts a system and method for providing security against a situation where a hacker is monitoring the power consumption of die 400 or certain components within die 400 during a programming operation. Specifically, in prior art flash memory systems, one could discern whether a cell was being programmed (i.e., a "0" was bring written into the cell) by monitoring the power consumption for each programming cycle, which would indicate whether a "0" is being programmed or not (here, not programmed means that the cell will remain a "1").

In the system of FIG. 14, when Data D is written to Address A in array 401, the complement of that data, DATA D-bar, is concurrently written into dummy array 1401. If Data D is "0", then Address A in array 401 will be programmed to a "1," and DATA D-bar will be a "1," meaning that no programming will occur in dummy array 401. If Data D is "1," then Address A in array 401 will be not be programmed, and DATA D-bar will be a "1" and will be programmed into a cell in dummy array 1401. Thus, for any programming operation, the power consumption will be the same, and a hacker therefore will not be able to determine whether the data at Address A in array 401 is a "0" or "1" based on the programming operation.

Figure 15B:
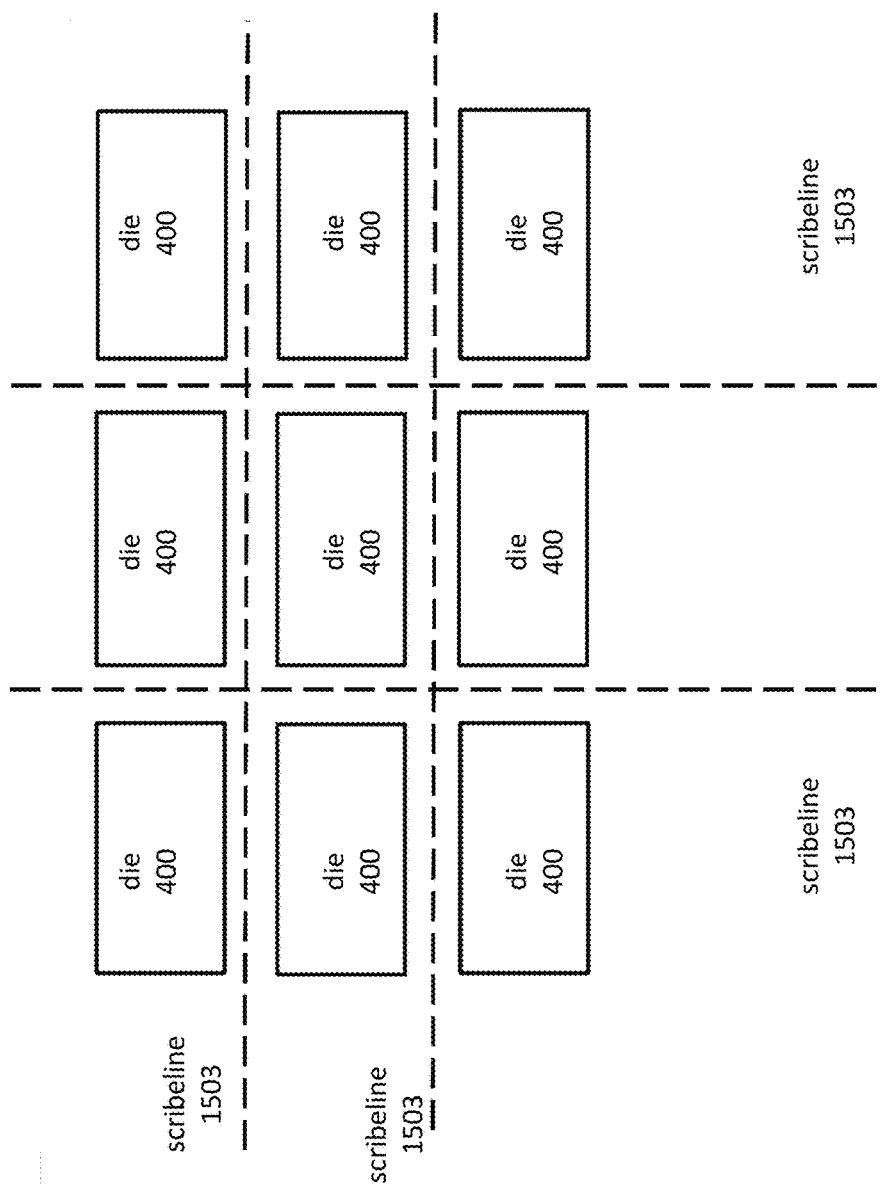
FIGS. 15A, 15B, and 15C depict a manufacturing technique for dies containing a flash memory system.
Figure 15A:
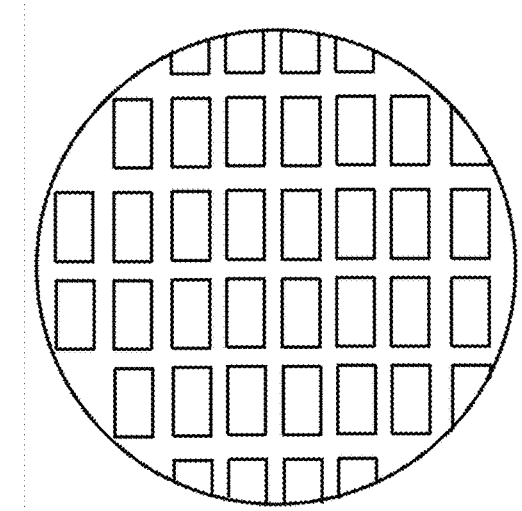

FIG. 15A depicts wafer 1501. In the prior art, wafer 1501 will be fabricated and will contain a plurality of different instantiations of die 400.

FIG. 15B depicts nine exemplary instances of die 400 within wafer 1501. In the prior art, it is common to include wafer test interconnect (not shown) inside each die. After 1501 is fabricated, wafer test interconnect (not shown) is used to test each die 400. Thereafter, once it is known which dies 400 have passed the testing procedure and which ones have not, wafer 1501 is sliced into individual dies 400. Exemplary slice lines, known as scribe lines 1503, are depicted in FIG. 15B. Hackers have been known to take prior art devices, remove the packaging, and access the contents of die 400 using the wafer test interconnect.

Figure 15C:
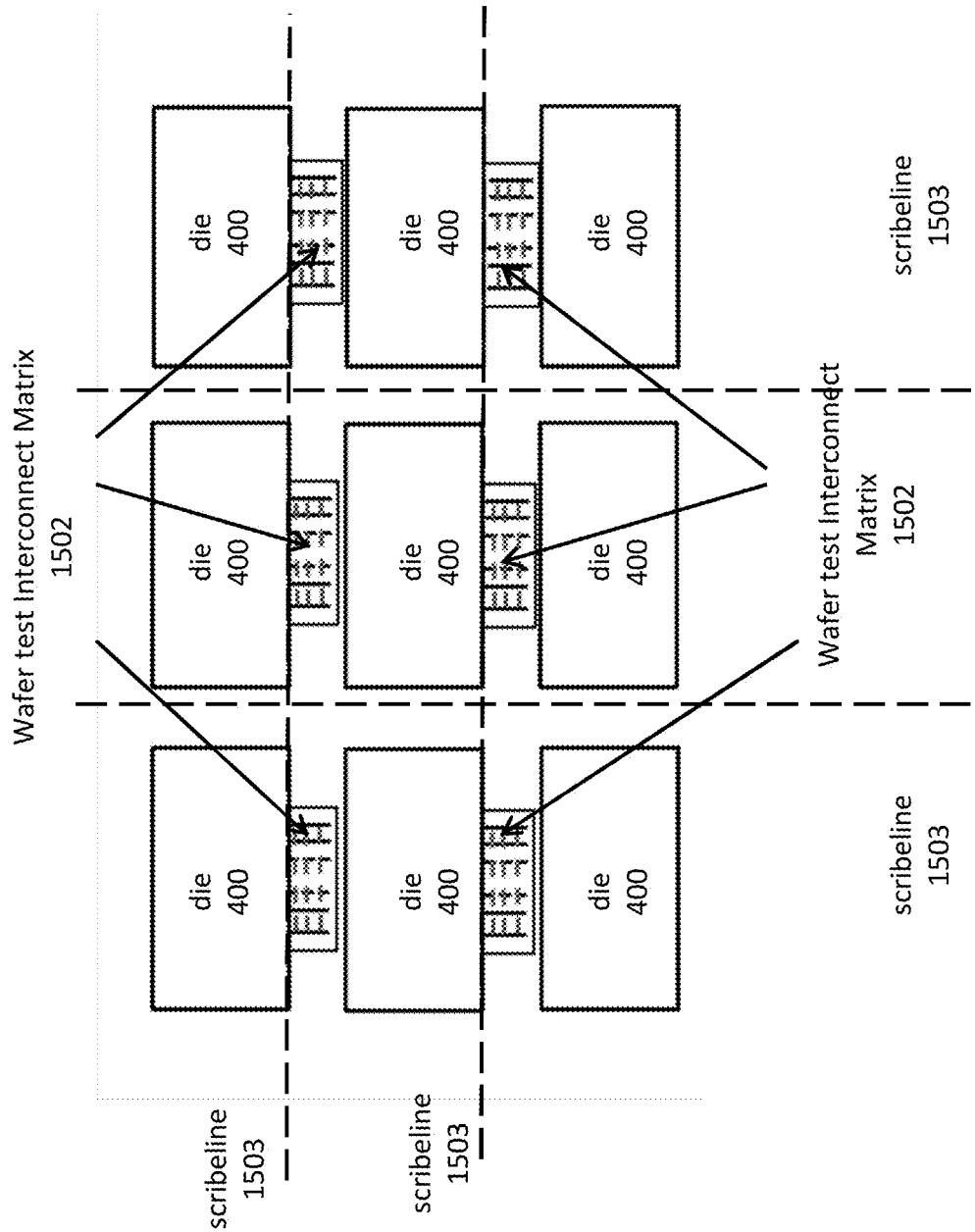

FIG. 15C depicts an improved method of slicing wafer 1501 with secured test interconnect. Wafer test interconnect matrix 1502 is shown to extend into the scribe region. Specifically, horizontal scribe lines are now made to be directly adjacent to the bottom edge of dies 400, thus removing each die 400 from its coupled wafer test interconnect matrix 1502 such that no remnants of wafer test interconnect matrix 1502 is attached to die 400 when die is packaged and sent to the field. Thus, hackers will not be able to access the contents of die 400 using wafer test interconnect matrix 1502 because the latter will no longer be present.

Figure 16:
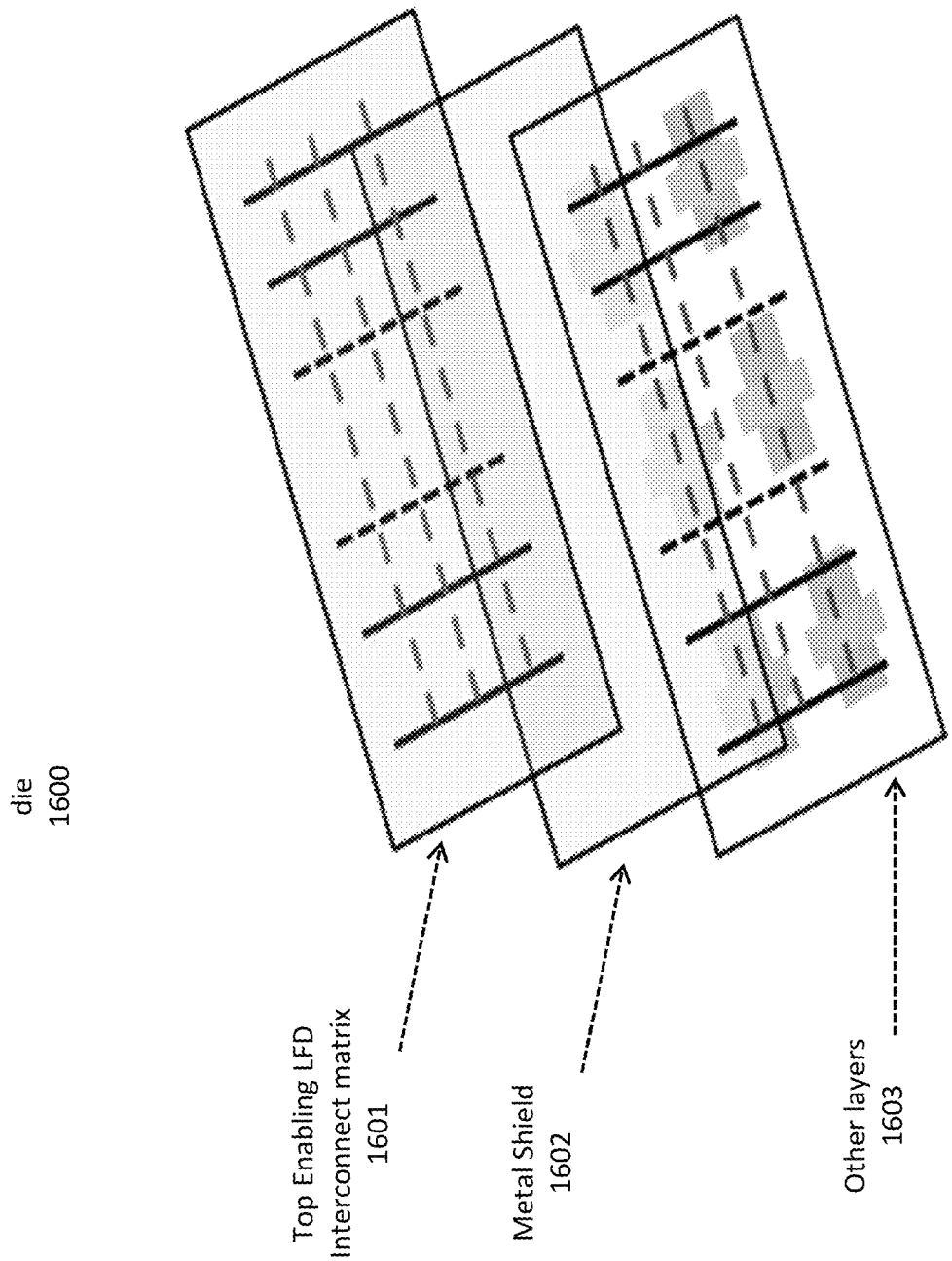
FIG. 16 depicts a die layout technique for a flash memory system.

FIG. 16 depicts die 1600, which is an embodiment of die 400. In the prior art, hackers often removed the package from a chip and electrically probed a semiconductor die to determine the contents of the die. Die 1600 contains a design for counteracting such activity. Die 1600 comprises top enabling logic fault detection (LFD) interconnect matrix 1601, metal shield 1602, and other layers 1603 (which includes the remaining active chip layers and metal layers). Top enabling LFD interconnect matrix 1601 and metal shield 1602 are essential components to the secured circuitry of die 1600. If a hacker electrically probes die 1600, the LFD interconnect matrix and/or metal shield 1602 will be damaged, and the circuitry coupled to the damaged area will be destroyed, as the metal that was damaged will cause short circuits and/or open circuits, resulting in intrusion fault detection, which allows on-chip controller to take preventive action or security measures, such as disabling chip access or chip operation. This makes it much more difficult for hackers to determine the contents of die 1600 by performing electrical probing of die 1600.

Figure 17A:
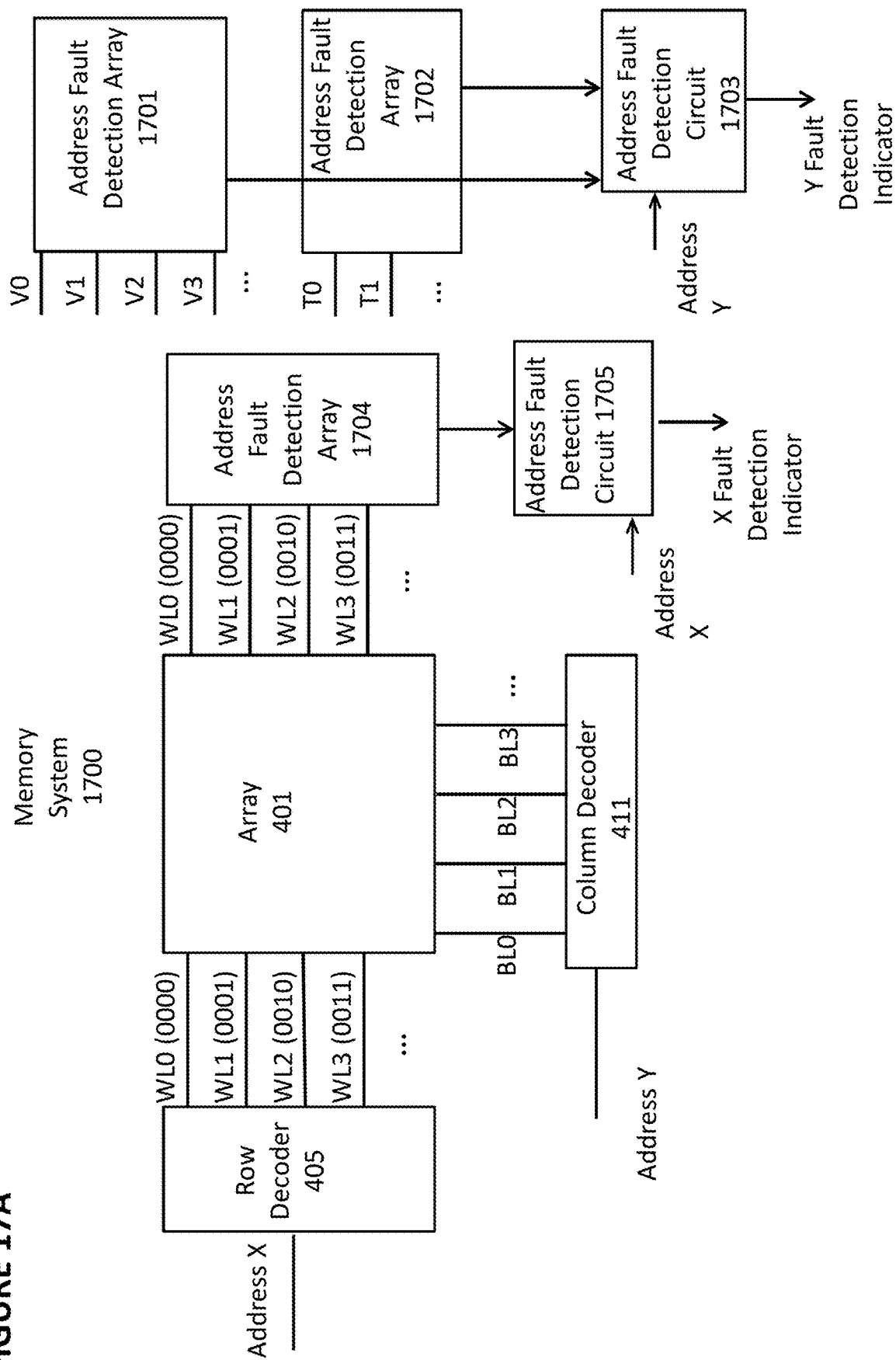
Figure 17B:
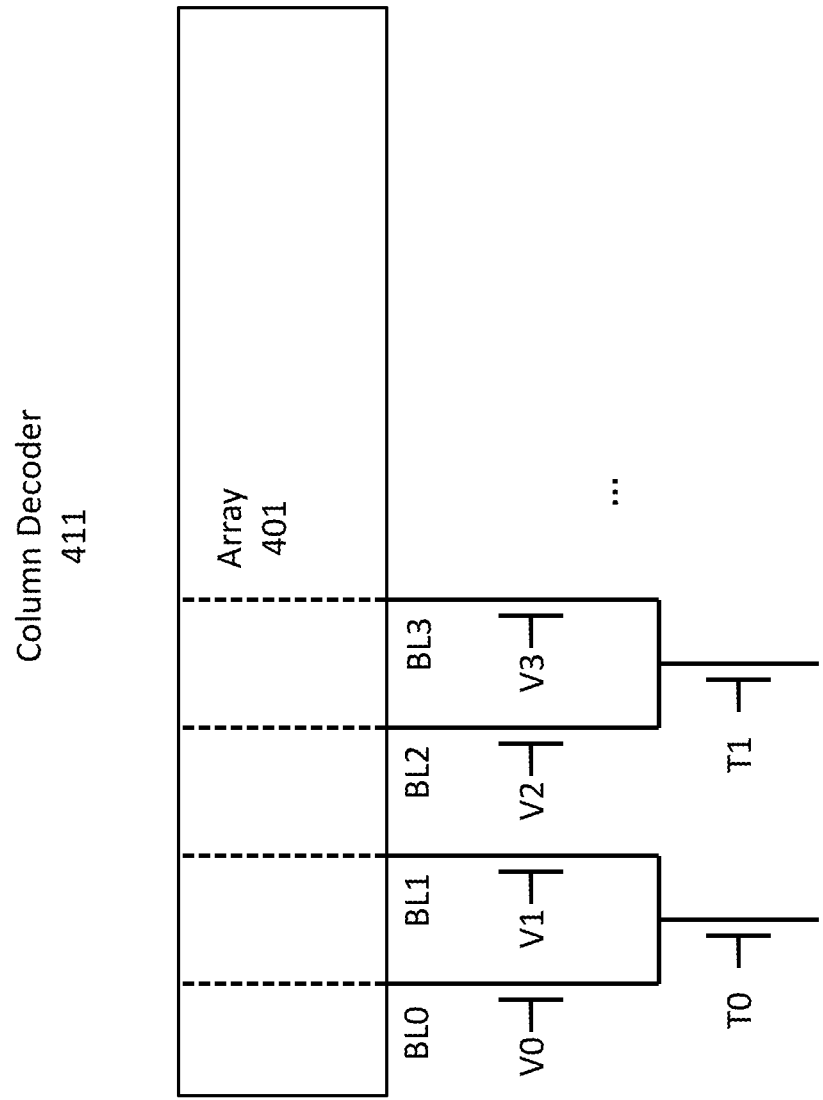

FIG. 17A depicts an embodiment of an address fault detection system. Memory system 1700 includes row decoder 405, array 401, and column decoder 411 as in previously described embodiments. Memory system 1700 further includes address fault detection array 1701, address fault detection array 1702, address fault detection array 1704, address fault detection circuit 1703 and address fault detection circuit 1705. Column decoder 411 is a set of multiplexors, and often will comprise tiered multiplexors. With reference to FIG. 17B, a portion of exemplary column decoder 411 is shown. Each column in array 401 is coupled to a bit line. Here, four bit lines are shown and labeled as BL0 to BL3. A first tier of multiplexors selects a pair of adjacent bit lines to be activated. Two such multiplexors are shown: T0 and T1. A second tier of multiplexors selects a bit line among a pair of adjacent bit lines. Here, each bit line has its own multiplexor, labeled as V0 through V3. Thus, if BL0 is intended to be selected, then W0 and V0 will be activated.

With reference again to FIG. 17A, it can be appreciated that column decoder 411 is susceptible to faults as is row decoder 405. In this example, Address Y is input to column decoder 411 and Address X is input to row decoder 405. Address Y contains bits that indicate which multiplexors are to be activated (which in turn will assert a bit line). Each bit line is coupled to a row in address fault detection array 1701. When a bit line is asserted, a row in address fault detection array 1701 will be asserted and a row in address fault detection array 1702 will be asserted, and a value will be output. That value can be compared to the column portion of Address Y. If the values are different, then a fault has occurred and the wrong bit line has been asserted. The address fault detection array 1704 is used to detect when an unwanted row address is asserted. When a row (such as wordline WL0) is asserted in a malicious manner, a row in the address fault detection array 1704 is asserted and a value is output. That value can be compared to the Address X by the address fault detection circuit 1705. If the values are different, then a fault has occurred and the wrong wordline line has been asserted.

An exemplary encoding scheme for use in the embodiment of FIG. 17A is shown in FIG. 17C. Here, two tiers of multiplexors are used. The first tier comprises multiplexors controlled by values T[0] through T[3], and the second tier comprises multiplexors controlled by values V[0] through V[7]. It is to be understood that additional tiers are possible. Here, each multiplexor in the first tier is associated with a three-bit value (e.g., V[0]=000), and each multiplexor in the second tier is associated with a two-bit value (e.g., T[0]=00). Address fault detection array 1701 and 1702 contains an encoded value for each multiplexor value. E each "0" in the column component of the address is encoded as "01," and each "1" in the address is encoded as "10."

With reference again to FIG. 17A, the encoding scheme of FIG. 17C can be used. Address fault detection circuit 1703 will output a "0" if a "11" or "00" pattern is detected in bit pairs of the encoded values stored in address fault detection array 1701. Thus, memory system 1700 is able to detect faults in the column components of addresses. This scheme is equally applied to the row address fault detection.

Figure 18:
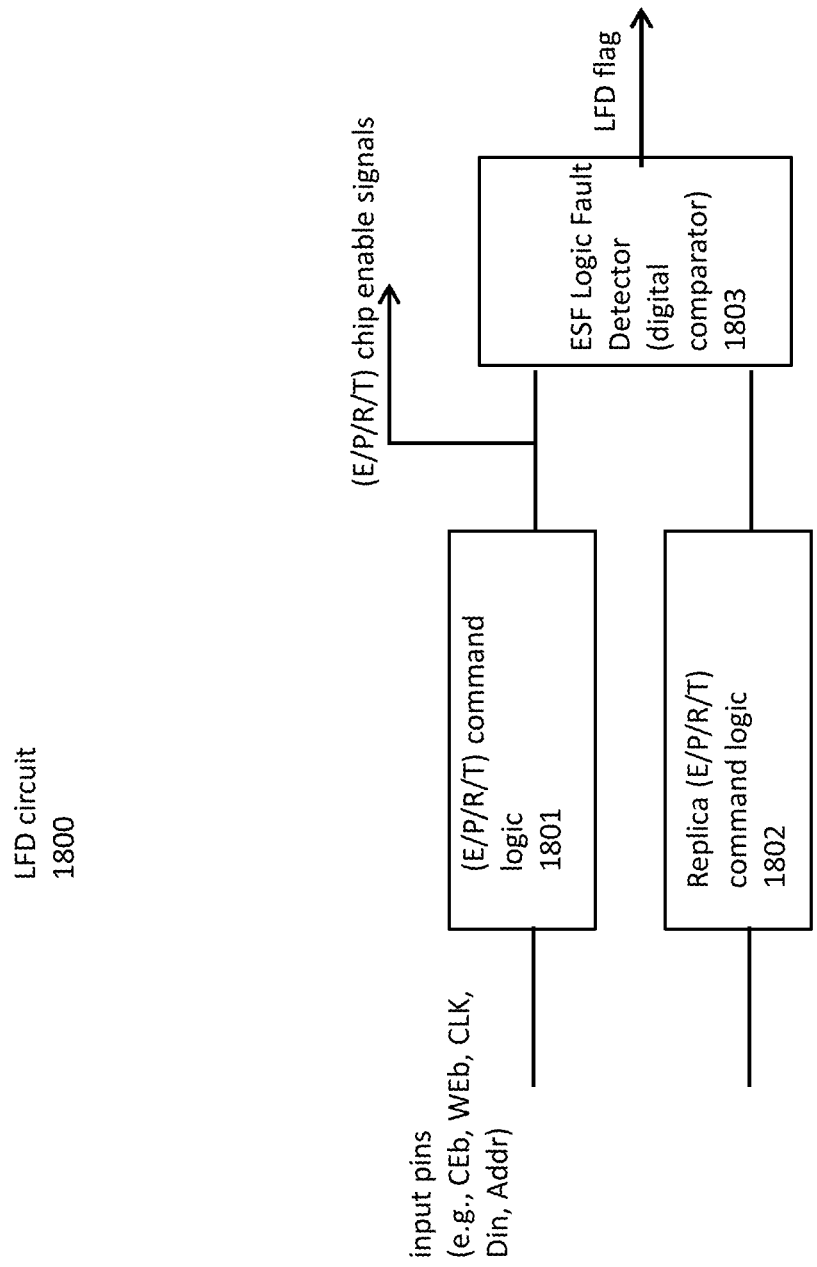
FIG. 18 depicts a logic fault detection circuit for a flash memory system.

FIG. 18 depicts logic fault detection circuit 1800. Logic fault detection circuit comprises erase/program/read/test (E/P/R/T) command logic 1801, replica erase/program/read/test command logic 1802, and logic fault detector (digital comparator) 1803. Erase/program/read/test command logic 1801 receives signals from input pins containing commands for a memory device, such as CEb, Web, CLK, Din, and Address signals and generates erase/program/read/test chip enable signals. Replica erase/program/read/test command logic 1802 generates erase/program/read/test chip enable signals partly based on stored configuration data (such as for E/P/R/T signals sequencing) and therefore can be considered the "ideal" enable signals that should be used during erase, program, read, and test operations. The enable signals from erase/program/read/test command logic 1801 and replica erase/program/read/test command logic 1802 are provided to logic fault detector (digital comparator) 1803 and compared. If the signals are the same, then the output of logic fault detector circuit 1803 indicates there is no fault. If the signals are different, then the output of logic fault detector circuit 1803 indicates there is a fault. A fault might occur, for instance, if a hacker force a read command using input pins in an attempt to read data stored in an array. A hacker might not know the exact sequence and timing of input signals to use, and the resulting enable signals from erase/program/read/test command logic 1801 might be slightly different than the ideal enable signals from replica erase/program/read/test command logic 1802, which would result in a LFD fault indication. The scheme can be used to detect the unwanted addressing logic by monitoring the addressing decoding circuitry.

Another embodiment of logic fault detection circuit 1800 is for replica erase/program/read/test command logic 1802 to receive the same signals from input pins as erase/program/read/test command logic 1801. This embodiment would provide security against a scenario in which a hacker bypasses the pins and simply provides enable signals directly, in which case logic fault detector 1803 will receive enable signals on one input (e.g., from the output of erase/program/read/test command logic 1801), but it will receive no enable signals from the other input (e.g., from replica erase/program/read/test command logic 1802), because the hacker will not know that it needs to provide the enable signals in two locations in order to not trigger a fault by logic fault detection circuit 1803.

Figure 19:
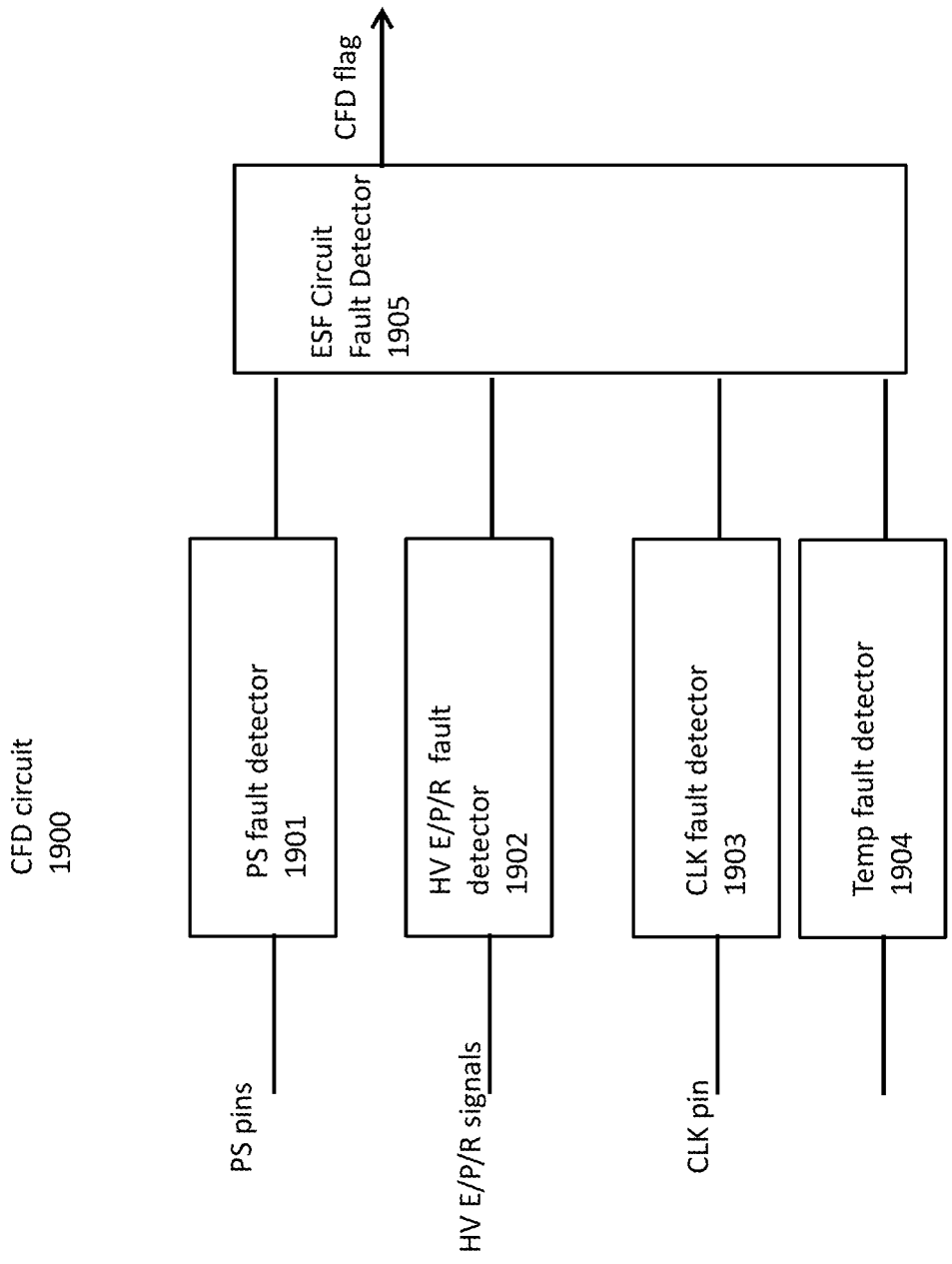
FIG. 19 depicts a chip fault detection circuit for a flash memory system

FIG. 19 depicts chip analog and/or mixed signal fault detection circuit 1900. Any tampering with the circuits that are used by the flash memory chip such as by physical intrusion such as by micro-probing would be detected. Chip fault detection circuit comprises power source fault detector 1901, high voltage erase/program/read fault detector 1902, clock (CLK) fault detector 1903, temperature fault detector 1904, and flash circuit fault detector 1905. Power source fault detector 1901 outputs a "1" when it detects a power source that it outside of a pre-specified range. High voltage erase/program/read fault detector 1902 outputs a "1" when it detects a high voltage signal that is outside of a pre-specified range. Clock fault detector 1903 outputs a "1" when it detects a clock signal that is outside of a pre-specified frequency range. Temperature fault detector 1904 outputs a "1" when it detects an operating temperature outside of a specified range. Flash circuit fault detector 1905 outputs a "1" if any of the other modules outputs a "1" (i.e., if a fault has been detected by any of the modules). In one embodiment, flash circuit fault detector 1905 is a NOR gate.

Figure 20:
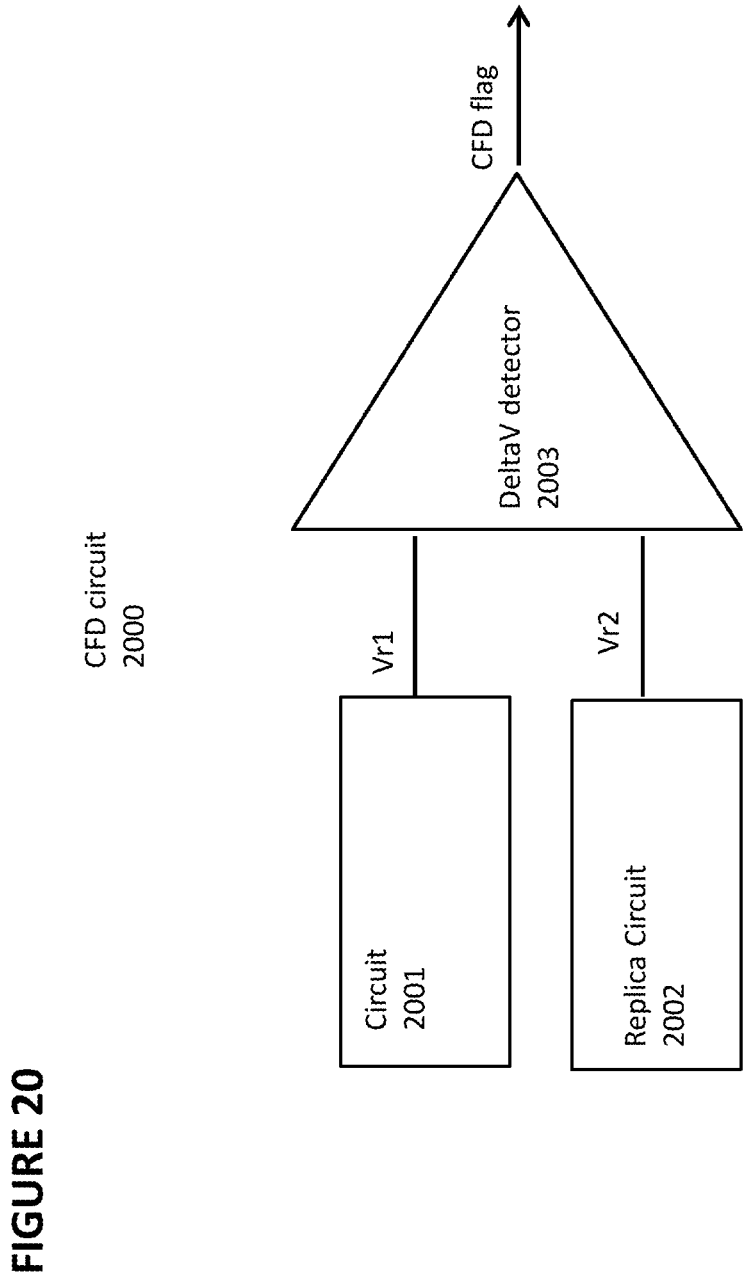
FIG. 20 depicts another chip fault detection circuit for a flash memory system.

FIG. 20 depicts chip fault detection circuit 2000. Chip fault detection circuit 2000 comprises circuit 2001 and replica circuit 2002. Circuit 2001 provides an output Vr1, and circuit 2001 provides an output Vr2. Vr1 and Vr2 are provided to DeltaV detector 2003, which outputs a "1" if the difference in voltage between Vr1 and Vr2 is above a certain threshold (such as 100-200 mV), and outputs a "0" otherwise. Examples of circuit 2001 include on-chip reference bandgap circuits, linear voltage regulator LDO (low drop out) circuits, HV regulators, etc. Chip fault detection circuit 2000 will protect against a situation where a hacker is probing the chip and is attempting to manipulate its behavior by injecting certain signals into the circuitry.

In all of the embodiments described above, if a fault is detected or some other event occurs that indicates a potential security breach, various counter-measures can be invoked. For example, a "chip enable" signal can be de-asserted, rendering the entire chip containing die 400 non-operational. Or a particular operation, such as a read operation, can be prevented by de-asserting a signal such as a read enable signal. Numerous other counter-measures are possible.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between). For example, forming an element "over a substrate" can include forming the element directly on the substrate with no intermediate materials/elements there between, as well as forming the element indirectly on the substrate with one or more intermediate materials/elements there between.

What is claimed is:

1. A flash memory system, comprising:
    an array comprising a first plurality of flash memory cells, a second plurality of flash memory cells, and a third plurality of flash memory cells;
    control circuitry for generating a random number based on the third plurality of flash memory cells; and
    decoding circuitry for receiving an address, wherein if the address corresponds to the first plurality of flash memory cells, the decoding circuitry, without performing a scrambling function, activates a row and column corresponding to the address for a read or program operation, and wherein if the address corresponds to the second plurality of flash memory cells, the decoding circuitry performs a scrambling function on the address utilizing the random number to generate a scrambled address and activates a row and column corresponding to the scrambled address for a read or program operation.

2. The flash memory system of claim 1, wherein the control circuitry derives the random number from leakage current in the third plurality of flash memory cells.

3. The flash memory system of claim 2, wherein the scrambled address is determined by applying the random number as an offset to the address.

4. The flash memory system of claim 1, wherein the control circuitry derives the random number from current resulting from a fixed program or erase voltage for the third plurality of flash memory cells.

5. The flash memory system of claim 4, wherein the scrambled address is determined by applying the random number as an offset to the address.

6. The flash memory system of claim 1, wherein the first plurality of flash memory cells, the second plurality of flash memory cells, and the third plurality of flash memory cells are split gate flash memory cells.

7. A method of accessing a first plurality of flash memory cells, a second plurality of flash memory cells, and a third plurality of flash memory cells in an array of flash memory cells, comprising:
    generating, by control circuitry, a random number based on the third plurality of flash memory cells;
    receiving, by decoding circuitry, an address;
    if the address corresponds to the first plurality of flash memory cells, without performing a scrambling function, activating a row and column corresponding to the address and performing a read or program operation at the address; and
    if the address corresponds to the second plurality of flash memory cells, performing a scrambling function on the address utilizing the random number to generate a scrambled address and activating a row and column corresponding to the scrambled address and performing a read or program operation at the scrambled address.

8. The method of claim 7, wherein the control circuitry derives the random number from leakage current in the third plurality of flash memory cells.

9. The method of claim 8, wherein the scrambled address is generated by applying the random number as an offset to the address.

10. The method of claim 7, wherein the control circuitry derives the random number from current resulting from a fixed program or erase voltage for the third plurality of flash memory cells.

11. The method of claim 10, wherein the scrambled address is generated by applying the random number as an offset to the address.

12. The method of claim 7, wherein the first plurality of flash memory cells, the second plurality of flash memory cells, and the third plurality of flash memory cells are split gate flash memory cells.

\* \* \* \* \*